United States Patent
Uemura et al.

(10) Patent No.: US 8,710,918 B2
(45) Date of Patent: Apr. 29, 2014

(54) ELECTRONIC COMPONENT AND REFLECTED-WAVE CANCELLING METHOD

(75) Inventors: Takeshi Uemura, Kawasaki (JP); Masaki Tosaka, Kawasaki (JP); Hitoshi Yokemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 13/535,990

(22) Filed: Jun. 28, 2012

(65) Prior Publication Data

US 2013/0049848 A1 Feb. 28, 2013

(30) Foreign Application Priority Data

Aug. 30, 2011 (JP) .................. 2011-187647

(51) Int. Cl.
*H04B 1/10* (2006.01)
(52) U.S. Cl.
USPC ....................................... 327/551
(58) Field of Classification Search
None
See application file for complete search history.

(56) References Cited

U.S. PATENT DOCUMENTS

| | | | | |
|---|---|---|---|---|
| 5,767,955 A | * | 6/1998 | Konno et al. | ............... 356/73.1 |
| 7,812,618 B2 | * | 10/2010 | Izumi | ........................... 324/642 |
| 7,880,543 B2 | | 2/2011 | Yamaguchi et al. | |

FOREIGN PATENT DOCUMENTS

| | | |
|---|---|---|
| JP | 2002-368600 A | 12/2002 |
| JP | 2005-033492 A | 2/2005 |
| JP | 2009-147512 A | 7/2009 |
| WO | WO 2008/026289 A1 | 3/2008 |

* cited by examiner

*Primary Examiner* — Lincoln Donovan
*Assistant Examiner* — Terry L Englund
(74) *Attorney, Agent, or Firm* — Fujitsu Patent Center

(57) ABSTRACT

An electronic component includes a driver that outputs a signal to a reception apparatus; a storage device storing therein reflection information related to a reflected wave that returns to the driver when the signal is reflected back by the reception apparatus; a reflected wave detector that based on the reflection information, determines a measurement period for measuring the reflected wave and that based on the measurement period, measures an arrival time and a peak amplitude of the reflected wave; and a controller that based on the arrival time and the peak amplitude, extracts reflected-wave cancelling information for inhibiting effects of the reflected wave from the reception apparatus and that sets the extracted reflected-wave cancelling information in the driver.

9 Claims, 17 Drawing Sheets

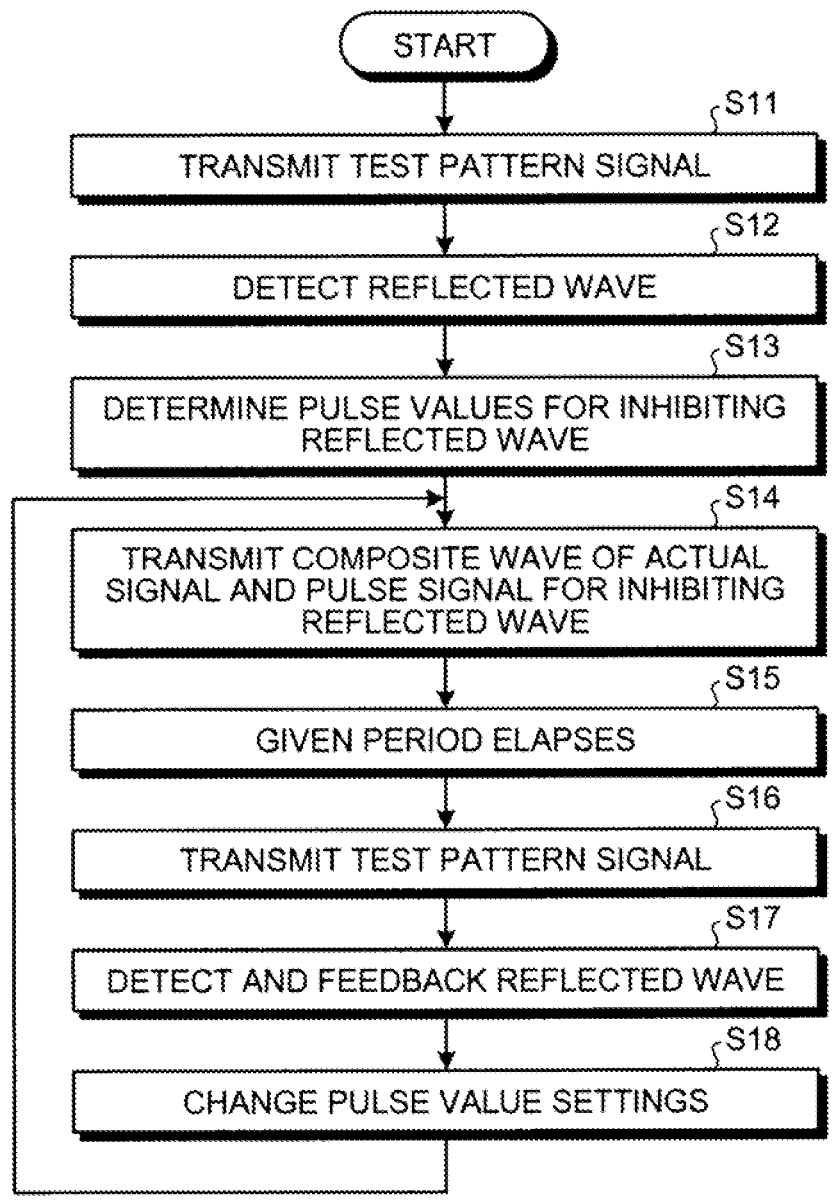

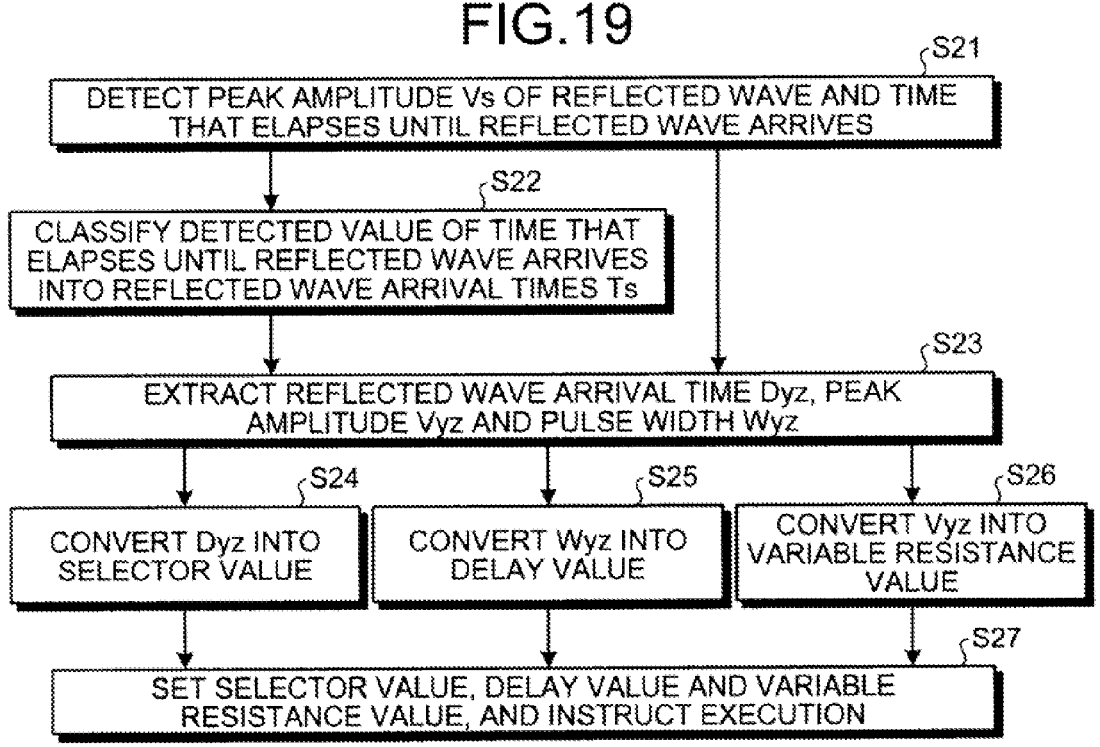
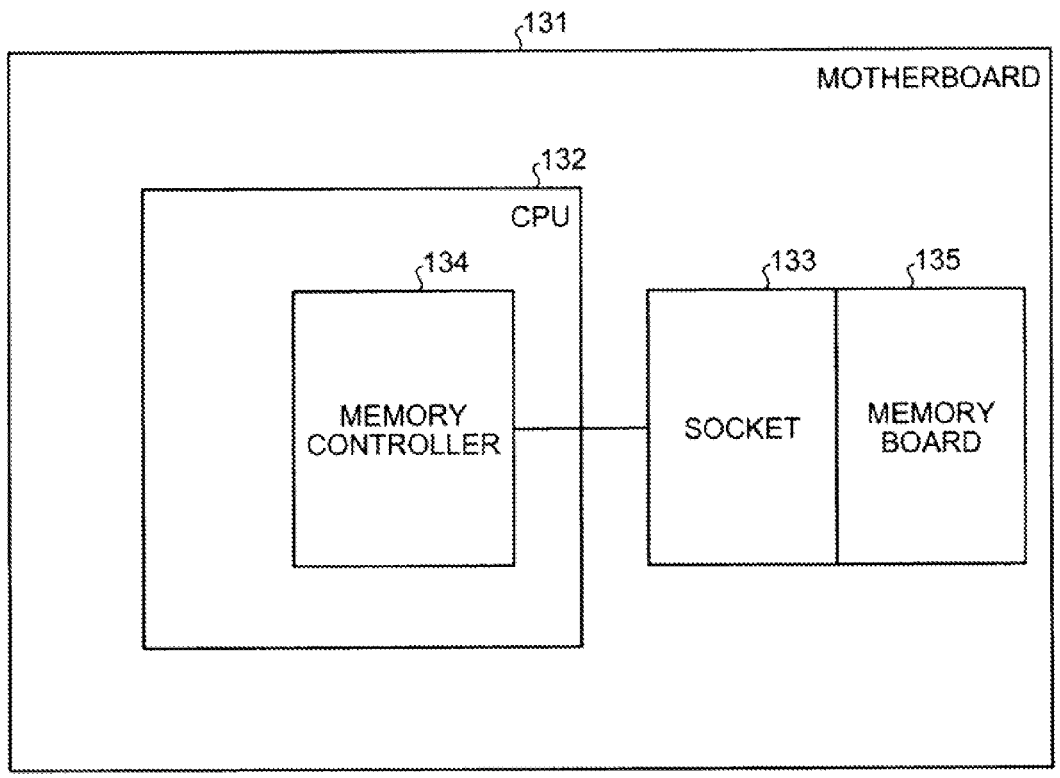

ELECTRONIC COMPONENT AND REFLECTED-WAVE CANCELLING METHOD

CROSS REFERENCE TO RELATED APPLICATIONS

This application is based upon and claims the benefit of priority of the prior Japanese Patent Application No. 2011-187647, filed on Aug. 30, 2011, the entire contents of which are incorporated herein by reference.

FIELD

The embodiments discussed herein are related to an electronic component and a reflected-wave cancelling method.

BACKGROUND

Conventionally, an electronic component includes a reflection suppressing component generator circuit that generates a component for suppressing reflection and a data output circuit that amplifies and outputs to a transmission line, the reflection suppressing component and data that is to be transmitted at the current time to the reception side (see, for example, International Publication Pamphlet No. WO 2008/026289).

Further, a conventional pre-emphasis circuit includes a first transistor to which a steady-state current is supplied, a second transistor operating similarly to the first transistor, a detector circuit that detects edges with contacts performing conduction for a given period during input signal transition, and an output buffer circuit that outputs to a transmission line, current supplied from the first and the second transistors (see, for example, Japanese Laid-Open Patent Publication No. 2002-368600).

Another conventional pre-emphasis circuit includes a first amplifier that converts a differential input signal into a differential current output, a bypass filter circuit, a second amplifier that converts the differential input signal that has passed through the bypass filter circuit, into a differential current output, and a resistor that respectively adds and voltage converts the 2 differential outputs (see, for example, Japanese Laid-Open Patent Publication No. 2009-147512).

A conventional signal combiner is configured such that the output terminal of a first voltage-to-current converter and the output terminal of a second voltage-to-current converter are commonly connected, enabling the ratio of the combined input signals in the output signal to be changed according to the ratio of transconductance of the first and the second voltage-to-current converters (see, for example, Japanese Laid-Open Patent Publication No. 2005-33492).

However, with the conventional electronic components, since reflected waves that should be inhibited cannot be distinguished from other reflected waves and exogenous noise, a signal capable of inhibiting the reflected waves that should be inhibited cannot be generated, arising in a problem that reflected waves that should be inhibited cannot be inhibited.

SUMMARY

According to an aspect of an embodiment, an electronic component includes a driver that outputs a signal to a reception apparatus; a storage device storing therein reflection information related to a reflected wave that returns to the driver when the signal is reflected back by the reception apparatus; a reflected wave detector that based on the reflection information, determines a measurement period for measuring the reflected wave and that based on the measurement period, measures an arrival time and a peak amplitude of the reflected wave; and a controller that based on the arrival time and the peak amplitude, extracts reflected-wave cancelling information for inhibiting effects of the reflected wave from the reception apparatus and that sets the extracted reflected-wave cancelling information in the driver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a flowchart of overall operations of the electronic component according to the second embodiment;

FIG. 19 is a flowchart of operations for extracting and setting reflected-wave cancelling information in the electronic component according to the second embodiment; and FIG. 20 is a block diagram depicting an example of a motherboard.

DESCRIPTION OF EMBODIMENTS

Preferred embodiments will be explained with reference to the accompanying drawings. Hereinafter, in each of the embodiments, identical components will be given the same reference number and redundant description will be omitted.

Figure 1:
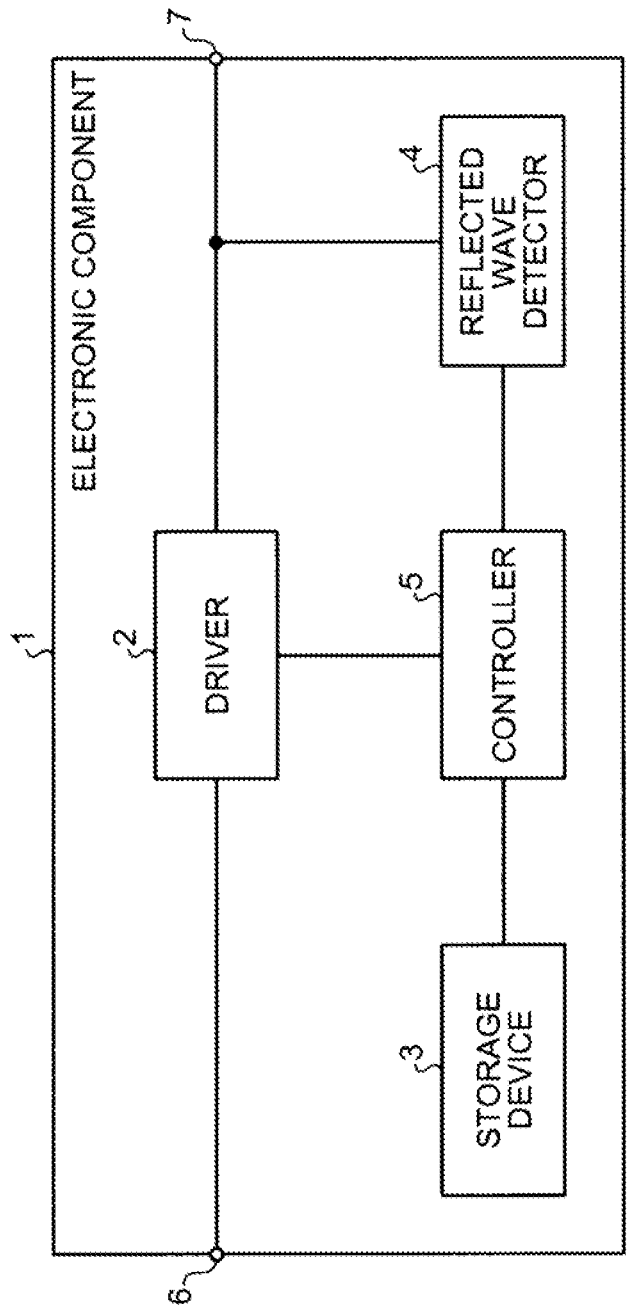
FIG. 1 is a block diagram of an electronic component according to a first embodiment.
Figure 2:
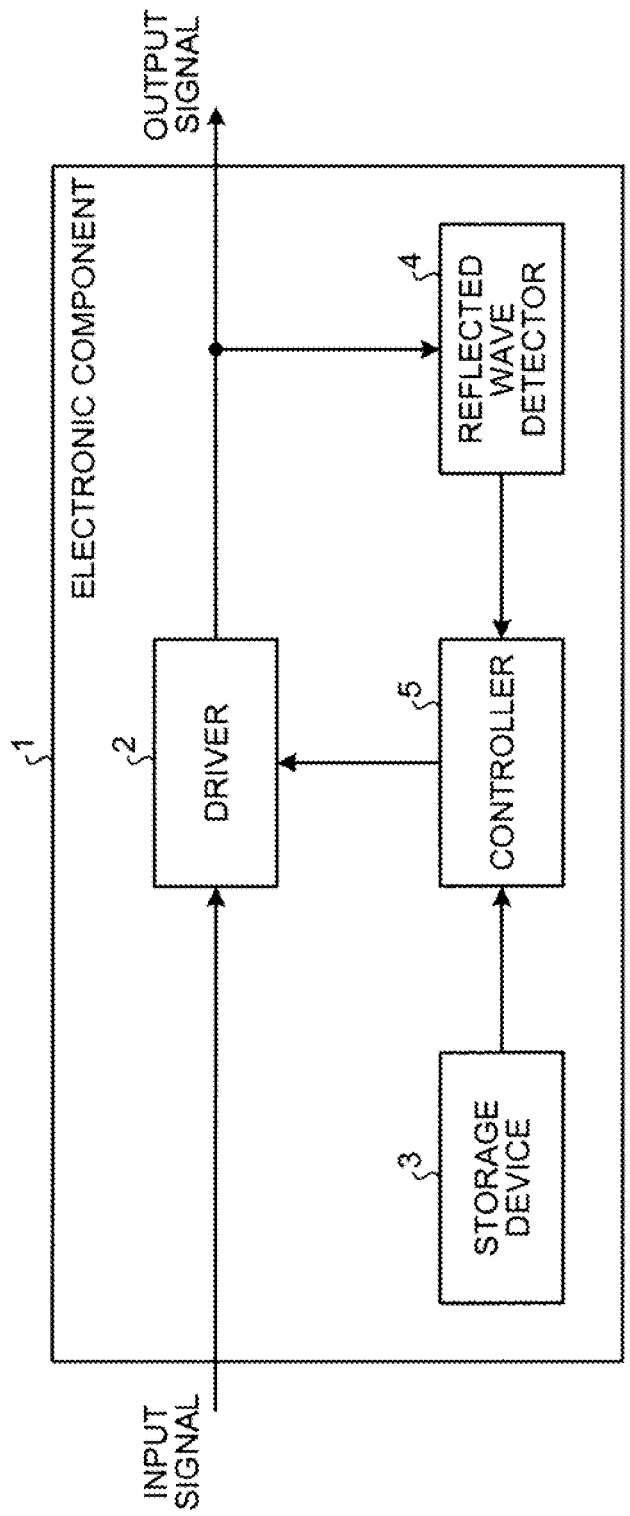
FIG. 2 is a block diagram depicting signal flow in the electronic component according to the first embodiment.

FIG. 1 is a block diagram of an electronic component according to a first embodiment. FIG. 2 is a block diagram depicting signal flow in the electronic component according to the first embodiment. As depicted in FIGS. 1 and 2, an electronic component 1 includes a driver 2, a storage device 3, a reflected wave detector 4, and a controller 5.

The input terminus of the driver 2 is connected to an input terminal 6 of the electronic component 1. The input terminal 6 is connected to, for example, a processor or a core of a processor that outputs a signal to the electronic component 1. The output terminus of the driver 2 is connected to an output terminal 7 of the electronic component 1. The output terminal 7 is connected to, for example, a reception apparatus that receives the signal output from the electronic component 1. The driver 2 outputs a signal to the reception apparatus, based on an input signal, for example.

The storage device 3 stores therein reflection information related to a reflected wave that returns to the driver 2 when a signal output by the driver 2 is reflected back by the reception apparatus. The reflected wave detector 4 is connected to the output terminal 7. The reflected wave detector 4, based on the reflection information related to the reception apparatus, determines a measurement period for measuring the reflected wave that is from the reception apparatus. The reflected wave detector 4, according to the determined measurement period, measures the arrival time of the reflected wave from the reception apparatus and the peak amplitude of the reflected wave.

The controller 5 is connected to the driver 2, the storage device 3, and the reflected wave detector 4. The controller 5, based on the arrival time and the peak amplitude measured by the reflected wave detector 4, extracts reflected-wave cancelling information for inhibiting the effects of the reflected wave occurring at the reception apparatus. The controller 5 sets the extracted reflected-wave cancelling information in the driver 2.

Figure 3:
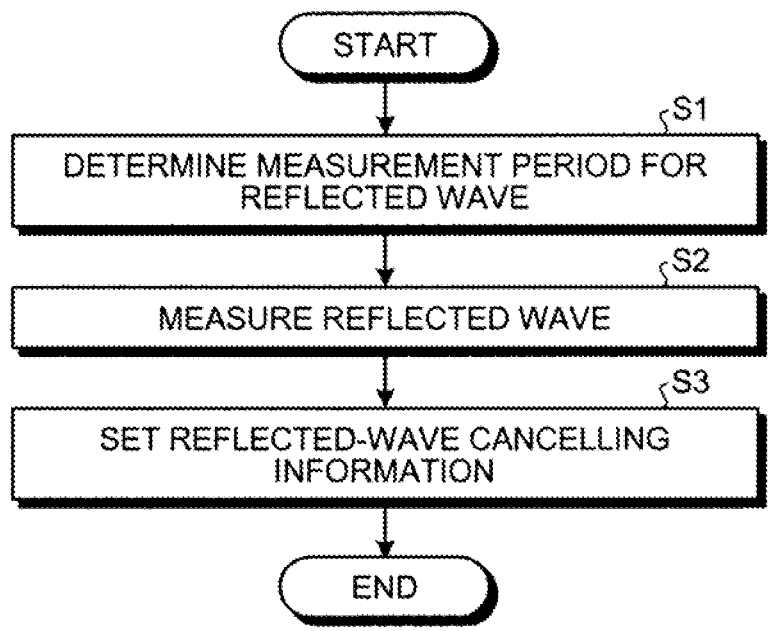
FIG. 3 is a flowchart of a reflected-wave cancelling method according to the first embodiment.

FIG. 3 is a flowchart of a reflected-wave cancelling method according to the first embodiment. As depicted in FIG. 3, at the electronic component 1, when the reflected-wave cancelling method is started, the reflected wave detector 4, based on reflection information, determines a measurement period for measuring a reflected wave (step S1). The reflection information may include information related to a reflected wave that returns to the driver that has output to a reception apparatus, a signal that is reflected back by the reception apparatus.

The reflected wave detector 4, during the measurement period determined at step S1, measures the reflected wave reflected by the reception apparatus (step S2). At step S2, for example, the arrival time and the peak amplitude of the reflected wave may be measured.

The controller 5 extracts reflected-wave cancelling information from the storage device 3. The reflected-wave cancelling information is extracted based on the arrival time and the peak amplitude of reflected wave measured at step S2. The reflected-wave cancelling information may include information for inhibiting the effects of the reflected wave occurring at reception apparatus. The controller 5 sets the extracted reflected-wave cancelling information in the driver 2 (step S3).

Figure 4:
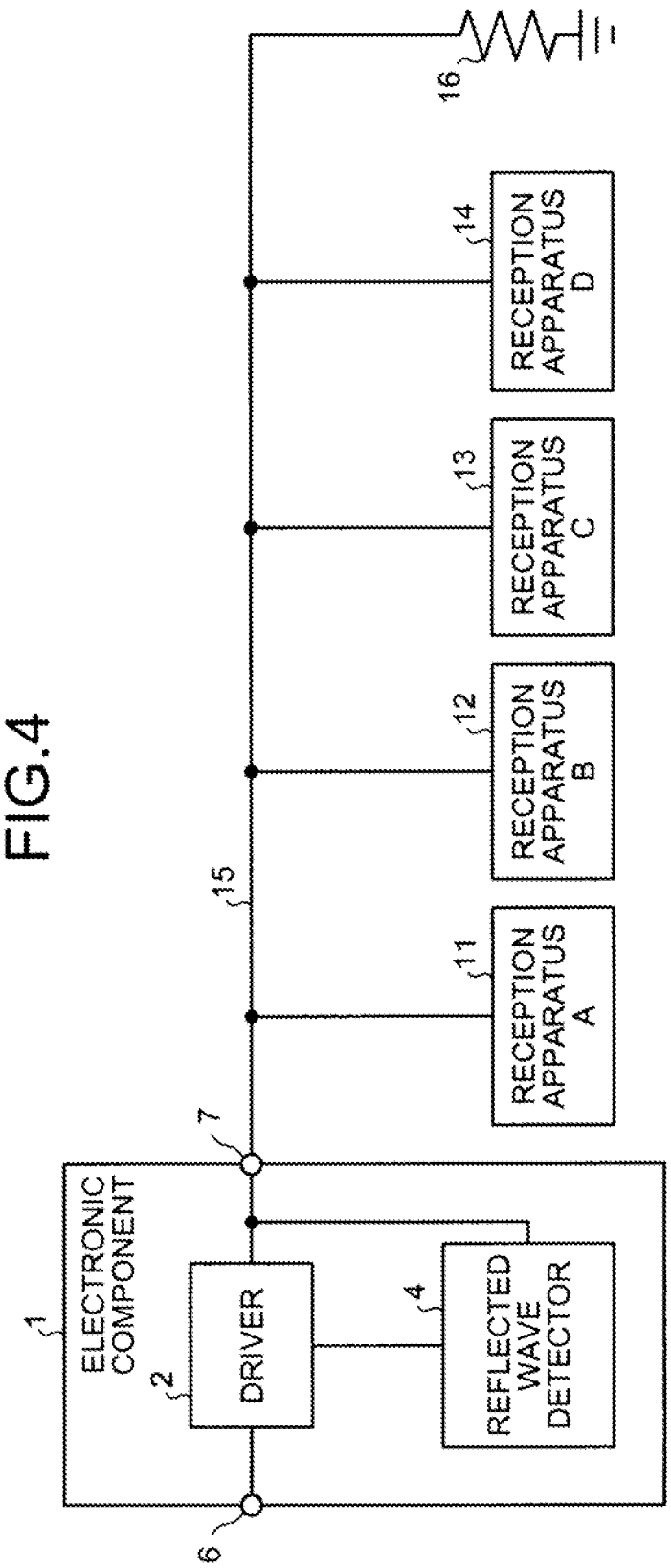
FIG. 4 is a block diagram depicting an example of a system adopting the electronic component according to the first embodiment.

FIG. 4 is a block diagram depicting an example of a system adopting the electronic component according to the first embodiment. As depicted in FIG. 4, the output terminal 7 of the electronic component 1 is connected to multiple reception apparatuses, e.g., a reception apparatus A11, a reception apparatus B12, a reception apparatus C13, and a reception apparatus D14, in descending order of proximity to the electronic component 1. The number of reception apparatuses to which the driver 2 is connected may be 2, 3, or 5 or more. The reception apparatuses A11 to D14 and the driver 2 may be connected by a bus 15 that transmits signals. The terminal of the bus 15 is connected to a terminating resistor 16. In FIG. 4, the storage device 3 and the controller 5 of the electronic component 1 are not depicted.

Figure 5:
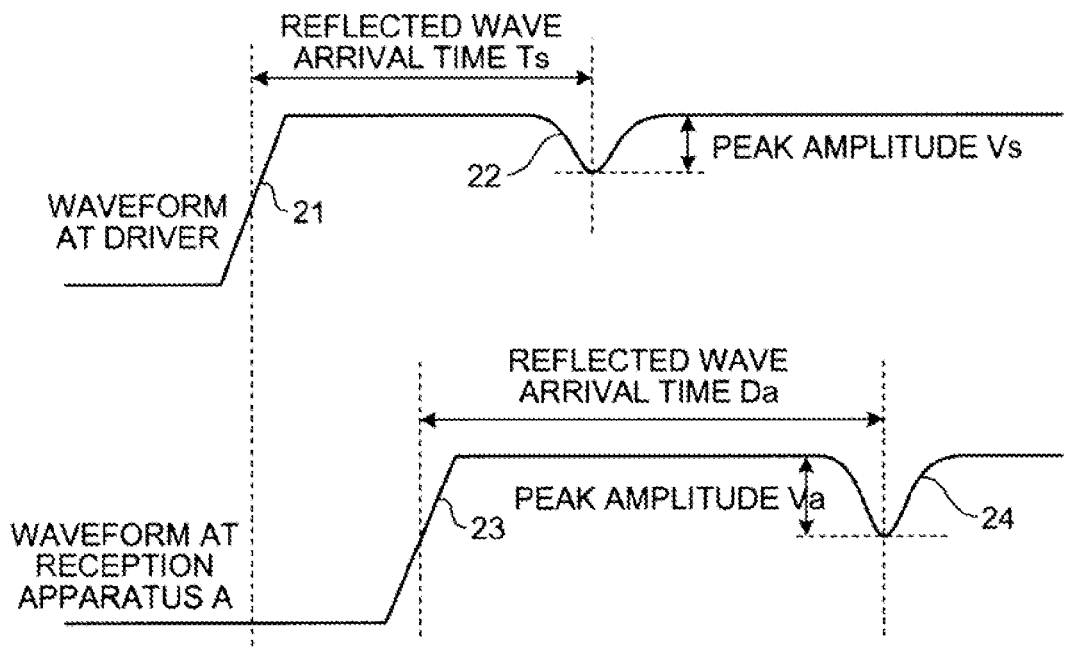
FIG. 5 is a waveform chart depicting waveforms when a reflected wave is not inhibited by a reception apparatus A in the system depicted in FIG. 4.

FIG. 5 is a waveform chart depicting waveforms when a reflected wave is not inhibited by the reception apparatus A in the system depicted in FIG. 4. In FIG. 5, the upper portion depicts the waveform at the driver 2 and the lower portion depicts the waveform at the reception apparatus A11 when the reflected wave is not inhibited.

As depicted in FIG. 5, when a signal 21 is output from the driver 2, a reflected wave 22 that is reflected by the reception apparatus A11 nearest the driver 2 is observed by the driver 2. In this example, after the output of the signal 21, the time (reflected wave arrival time) that elapses until the reflected wave 22 reaches the driver 2 is represented by Ts and the peak amplitude of the reflected wave 22 is represented by Vs.

Reflected waves from the reception apparatuses B12 to D14, which are farther away from the driver 2 than the reception apparatus A11, have the potential of reaching the driver 2. However, the amplitudes of the reflected waves are attenuated by the accompanying longer bus 15 length and therefore, reflected waves from the reception apparatuses B12 to D14 may be assumed to have no appreciable effect on waveform at the driver 2.

On the other hand, at the reception apparatus A11, a reflected wave 24 from the reception apparatus B12, which is nearest the reception apparatus A11 on the terminating resistor 16 side, is observed. In this example, the time (reflected wave arrival time) that elapses after a signal 23 has reached the reception apparatus A11 until the reflected wave 24 reaches the reception apparatus A11 is represented by Da and the peak amplitude of the reflected wave 24 is represented by Va.

Reflected waves from the reception apparatuses C13 and D14, which are farther away from the driver 2 than the reception apparatus B12, have the potential of reaching the reception apparatus A11. However, similar to the waveform at the driver 2, the amplitudes of the reflected waves are attenuated according to the bus 15 length and therefore, the reflected waves from the reception apparatuses C13 and D14 may be assumed to have no appreciable effect on waveform at the reception apparatus A11.

Figure 6:
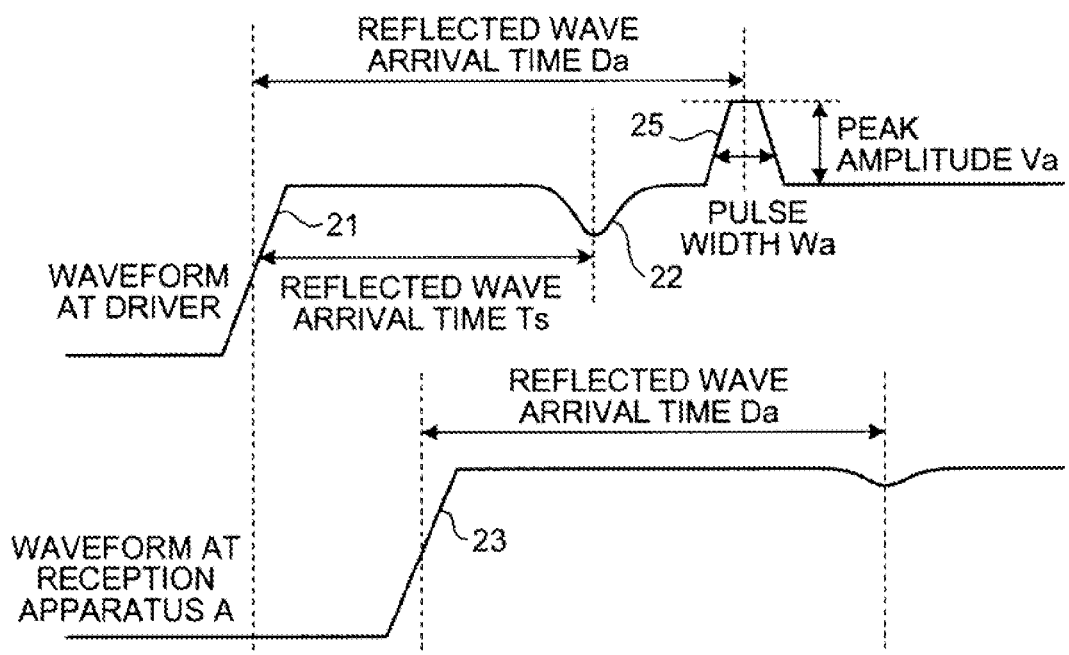
FIG. 6 is a waveform chart depicting waveforms when a reflected wave is inhibited by the reception apparatus A in the system depicted in FIG. 4.

FIG. 6 is a waveform chart depicting waveforms when a reflected wave is inhibited by the reception apparatus A in the system depicted in FIG. 4. In FIG. 6, the upper portion depicts the waveform at the driver 2 and the lower portion depicts the waveform at the reception apparatus A11 when the reflected wave is inhibited.

As depicted in FIG. 6, after the signal 21 has been output, the driver 2 outputs a signal 25 at a point in time that is the same as the reflected wave arrival time Da when the reflected wave 24 reaches the reception apparatus A11 (refer to FIG. 5) or substantially the same as the point in time when the reflected wave arrival time Da elapses. The polarity of the signal 25 is opposite the polarity of the reflected wave 24 from the reception apparatus B12 (refer to FIG. 5).

The peak amplitude Va of the signal 25 is the same or substantially the same as the peak amplitude Va of reflected wave 24 from the reception apparatus B12 (refer to FIG. 5). A pulse width Wa of the signal 25 may be the same or substantially the same as the pulse width (refer to FIG. 5) of the reflected wave 24 from the reception apparatus B12.

The output timing of the signal 25, i.e., the reflected wave arrival time Da after the output of the signal 21 at the driver 2, may be determined based on the reflected wave arrival time Ts and the peak amplitude Vs related to the reflected wave 22 that is from the reception apparatus A11 and observed at the driver 2. The peak amplitude Va of the signal 25 may be determined similarly. The pulse width Wa of the signal 25 may also be determined similarly.

For the reception apparatus B12, when the reflected wave from the reception apparatus C13 is inhibited, the case is similar to that described above. However, the reflected wave from the reception apparatus A11 is measured by the driver 2 and based on the reflected wave arrival time Ts (the time consumed until the reflected wave reaches the driver 2) and the peak amplitude Vs of the reflected wave, the driver 2 outputs a signal that can inhibit the reflected wave that is from the reception apparatus C13 and reaches the reception apparatus B12. For the reception apparatus C13, when the reflected wave from the reception apparatus D14 is inhibited, the case is similar to that described above.

According to the first embodiment, the reflected wave detector 4, during the measurement period for measuring reflected waves, measures a reflected wave that is output from the driver 2, is reflected by a given reception apparatus, and returns to the driver 2. Consequently, the measurement of reflected waves from reception apparatuses other than the given reception apparatus and exogenous noise can be prevented. In other words, the generation of a signal that inhibits reflected waves from reception apparatuses other than the given reception apparatus and exogenous noise can be prevented, while a signal that can inhibit a reflected wave that should be inhibited can be generated.

A second embodiment is an application of the electronic component and the reflected-wave cancelling method according to the first embodiment to, for example, a driver circuit that applies a driving voltage to memory when data is written or read, for example, in an electronic device such as a computer. A driver circuit for memory, for example, may be disposed on an integrated circuit (IC) chip of a memory controller connected to memory and may be disposed on a substrate such as a motherboard having mounted thereto a memory board.

For example, in the system depicted in FIG. 4, the reception apparatuses A11 to D14 may be memory. The bus 15 may be a 1:N branching line that propagates a signal such as a command signal and an address signal to N reception apparatuses (4 in the figure) such as memory. Double Data Rate 3 Synchronous Dynamic Random Access Memory (DDR3 SDRAM) may be given as 1 example of the memory.

Figure 7:
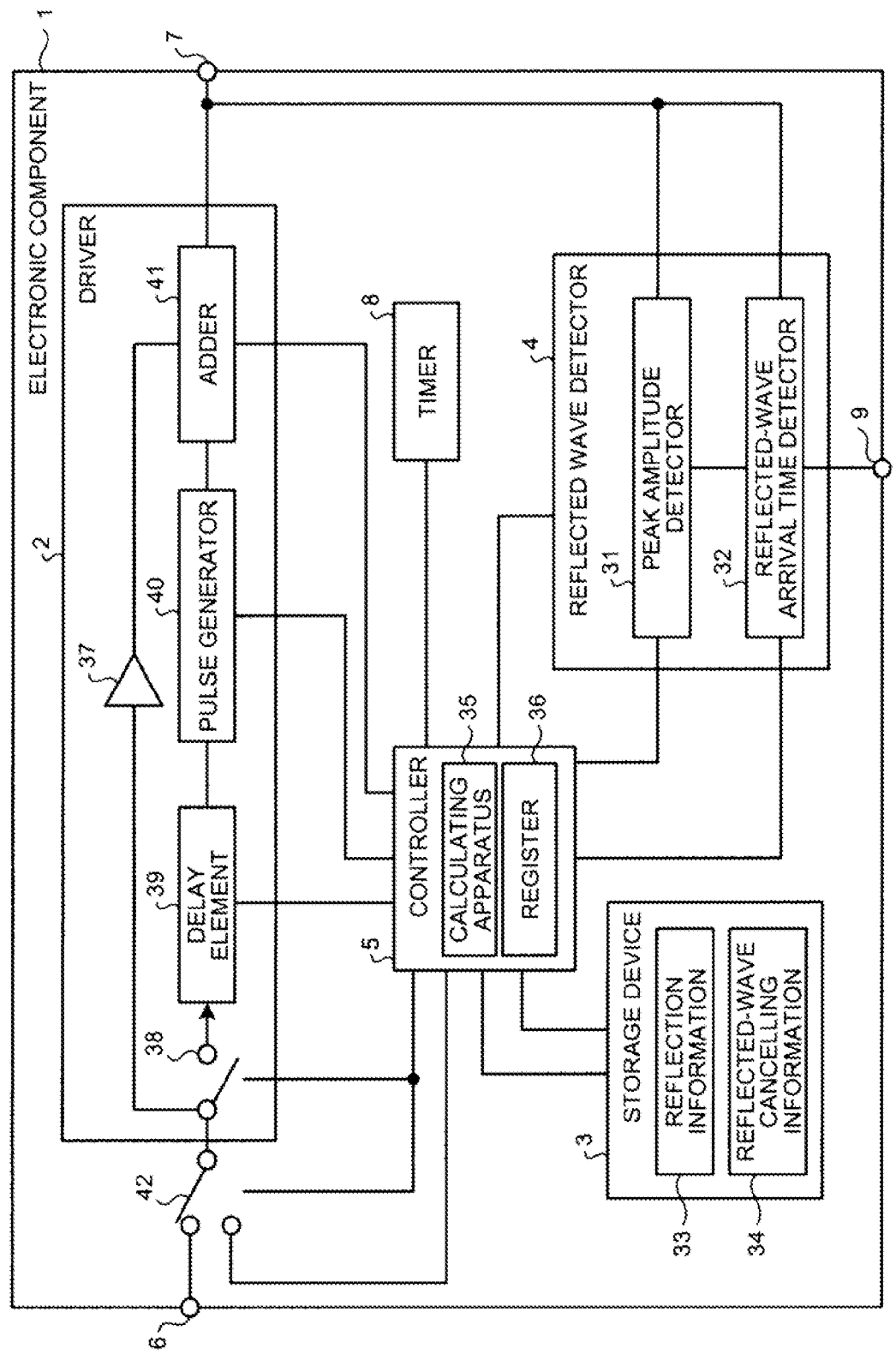
FIG. 7 is a block diagram of the electronic component according to a second embodiment.
Figure 8:
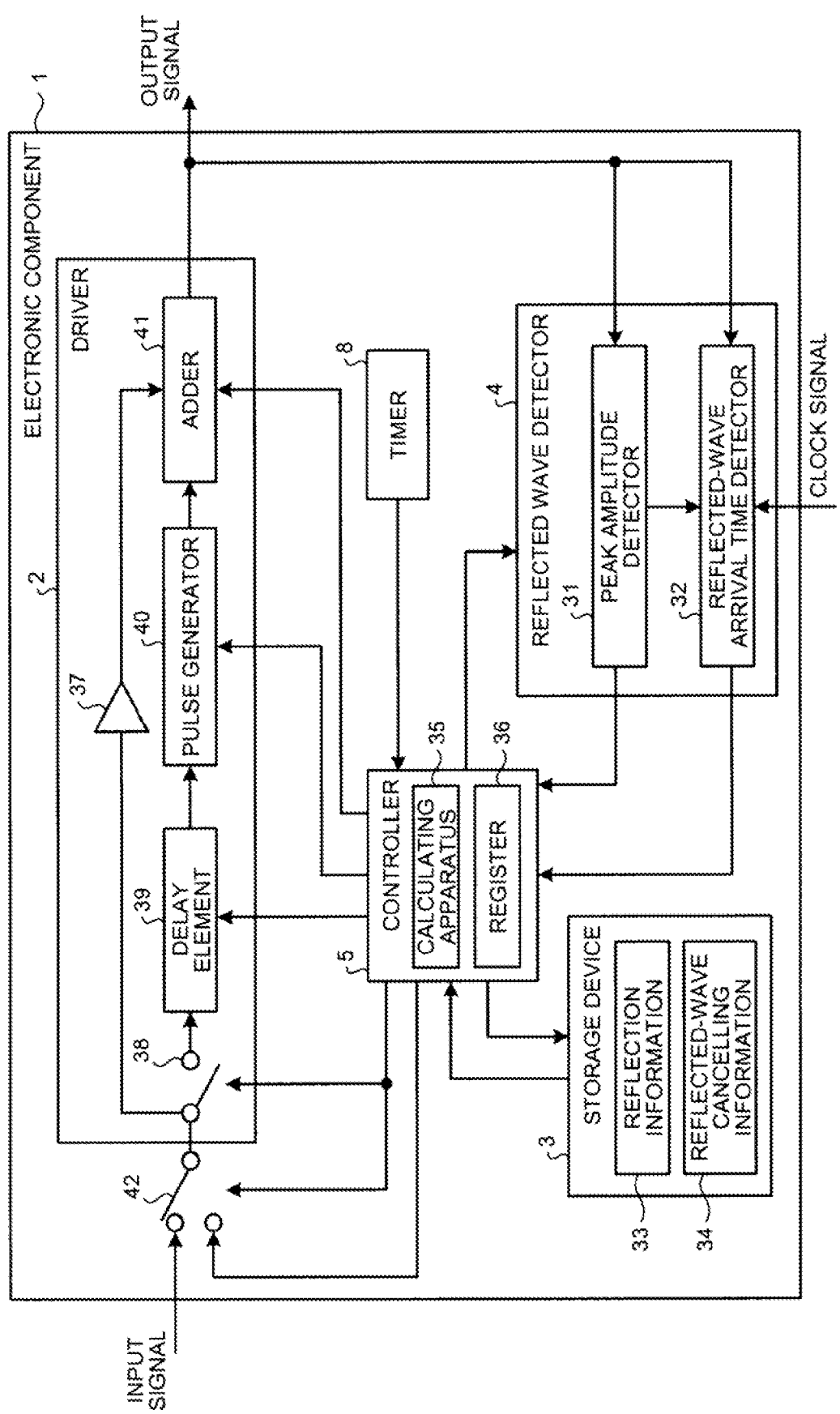
FIG. 8 is a block diagram of signal flow in the electronic component according to the second embodiment.

FIG. 7 is a block diagram of the electronic component according to the second embodiment. FIG. 8 is a block diagram of signal flow in the electronic component according to the second embodiment. As depicted in FIGS. 7 and 8, the electronic component 1 includes a timer 8 in addition to the driver 2, the storage device 3, the reflected wave detector 4, and the controller 5. The timer 8 is connected to the controller 5 and at constant intervals, outputs a timing signal to the controller 5.

The reflected wave detector 4 is connected to the controller 5. The reflected wave detector 4 receives the input of an enable signal from the controller 5. The reflected wave detector 4 includes a peak amplitude detector 31 and a reflected-wave arrival time detector 32. The peak amplitude detector 31 and the reflected-wave arrival time detector 32 are connected to the output terminal 7 of the electronic component 1. The output terminal 7 inputs to the peak amplitude detector 31 and the reflected-wave arrival time detector 32, a reflected wave that has been reflected back by the reception apparatus A11 (not depicted).

The peak amplitude detector 31 detects the peak value of the reflected wave (peak amplitude) while the enable signal is asserted. The peak amplitude detector 31 stores the detected value, as the peak amplitude Vs, to a register 36 of the controller 5. The peak amplitude detector 31 outputs to the reflected-wave arrival time detector 32, a select signal based on the detection result. Details of the peak amplitude detector 31 will be described hereinafter.

The reflected-wave arrival time detector 32 is connected to the peak amplitude detector 31 and to an input terminal 9 for a clock signal of the electronic component 1. The reflected-wave arrival time detector 32 receives the input of a clock signal from, for example, a non-depicted clock generator circuit. The reflected-wave arrival time detector 32, while the enable signal from the controller 5 is asserted, measures time based on the clock signal, and detects the time that elapses until the reflected wave reaches the reflected-wave arrival time detector 32, based on the select signal. The reflected-wave arrival time detector 32 outputs the detected value to the controller 5. Details of the reflected-wave arrival time detector 32 will be described hereinafter.

The storage device 3 is connected to the controller 5. The storage device 3 stores therein reflection information 33 and reflected-wave cancelling information 34. The reflection information 33 and the reflected-wave cancelling information 34 are, for example, may be preliminarily prepared by the user of the electronic component 1 and written to the storage device 3. The reflection information 33 includes information estimating the time that elapses until the reflected wave 22 that is reflected by the reception apparatus A11 reaches the driver 2. The estimated arrival time for the reflected wave 22 may be obtained based on substrate property values and line conditions.

For example, if the relative permittivity of a space encompassed by the line conductor of the bus 15 is ϵ and the speed of light is $C(=3 \times 10^8 [m/s])$, propagation delay D of a signal propagated by the bus 15 is expressed by equation (1). Further, if the distance from the driver 2 to the reception apparatus A11 is L[m], time t, which is the time that elapses from the output of the signal 21 by the driver 2 until the reflected wave 22 returns to the driver 2, i.e., the estimated arrival time for the reflected wave 22, is expressed by equation (2).

$$D = \sqrt{\epsilon}/C \quad (1)$$

$$t = 2DL \quad (2)$$

The reflected-wave cancelling information 34 includes information used in generating the signal 25 that can inhibit the reflected wave 24 that is reflected by the reception apparatus B12 and has the potential of being observed at the reception apparatus A11 (refer to FIG. 6). For example, the reflected-wave cancelling information 34 includes information that prescribes the relation between the reflected wave arrival time Ts/the peak amplitude Vs of the reflected wave 22 that is reflected by the reception apparatus A11 and observed at the driver 2 and the reflected wave arrival time Da/the peak amplitude Va of the signal 25 that is generated to inhibit the reflected wave 24 (refer to FIG. 6).

The reflected-wave cancelling information 34 may include information that prescribes the relation between the reflected wave arrival time Ts/the peak amplitude Vs of the reflected wave 22 and the pulse width Wa of the signal 25 generated for inhibiting the reflected wave 24 (refer to FIG. 6). The reflected-wave cancelling information 34 may include information that is used in the generation of signals that can respectively inhibit a reflected wave that is reflected by the reception apparatus C13 and has the potential of being observed at the reception apparatus B12, a reflected wave that is reflected by the reception apparatus D14 and has the potential of being observed at the reception apparatus C13, and a reflected wave that is reflected by the terminating resistor 16 and has the potential of being observed at the reception apparatus D14. An example of the reflected-wave cancelling information 34 is depicted in FIG. 9.

Figure 9:
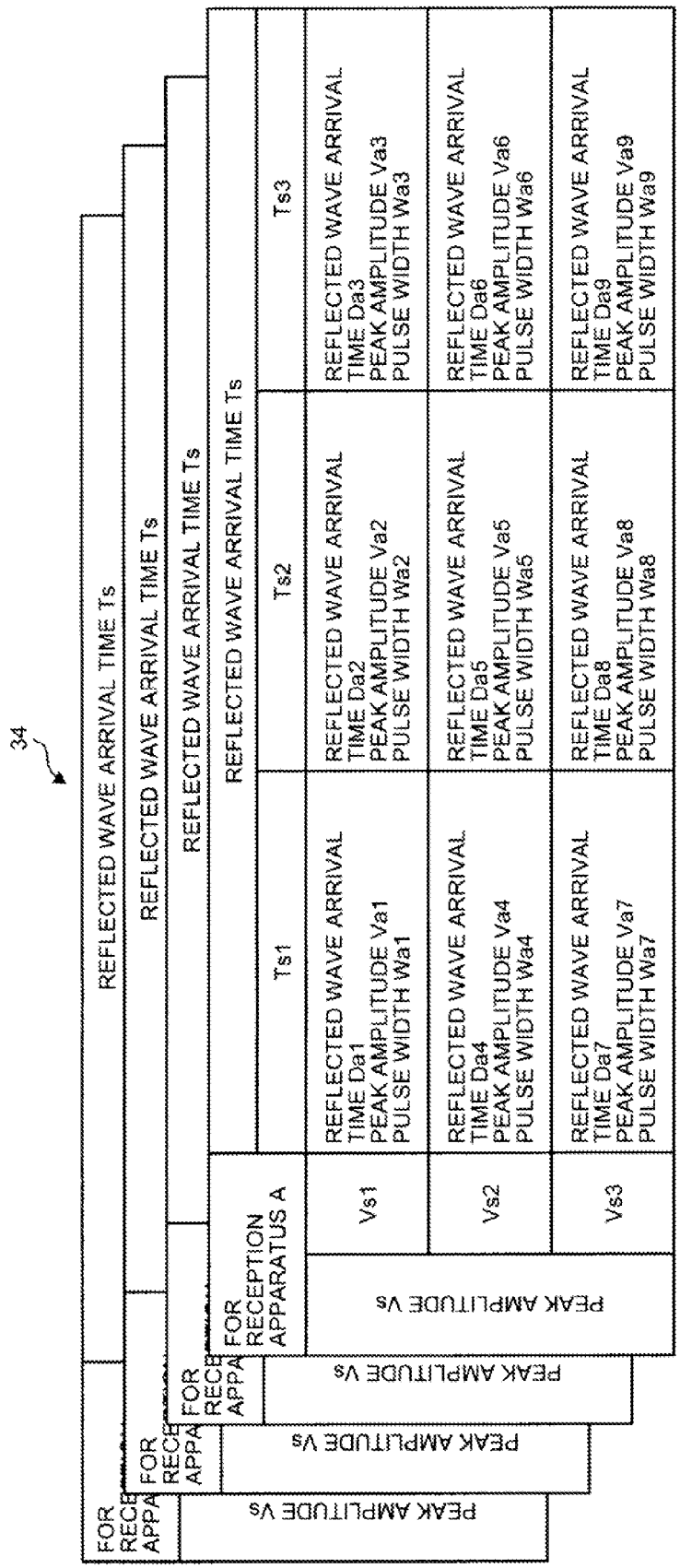
FIG. 9 is a diagram depicting an example of reflected-wave cancelling information according to the second embodiment.

FIG. 9 is a diagram depicting an example of the reflected-wave cancelling information according to the second embodiment. As depicted in FIG. 9, concerning the reception apparatuses A11 to D14, for various combinations of reflected wave arrival times Tsx and the peak amplitudes Vsx, reflected wave arrival times Dyz, peak amplitudes Vyz and pulse widths Wyz may be prescribed. For each reception apparatus, multiple reflected wave arrival times Ts and peak amplitudes Vs are set, whereby even if the characteristics of the reflected wave arrival time Ts and/or the peak amplitude Vs changes during operation of the electronic component 1, a reflected wave arrival time Dyz, a peak amplitude Vyz and a pulse width Wyz corresponding to the change can be selected.

Here, an index "x" is appended to distinguish multiple values (although not limited hereto, 3 in the example depicted) concerning reflected wave arrival times Ts and peak amplitudes Vs. An index "y" is appended to distinguish the reception apparatuses A to D. For example, as depicted in the example, concerning the reflected-wave cancelling information 34 used for generating a signal that can inhibit a reflected wave that is reflected by the reception apparatus B12 and has the potential of being observed at the reception apparatus A11, index "y" is indicated as "a". An index "z" is appended to distinguish values for each combination of a reflected wave arrival time Tsx and a peak amplitude Vsx.

As an example concerning the reflected-wave cancelling information, in reflected-wave cancelling information for the reception apparatus A11, the reflected wave arrival times Ts1, Ts2 and Ts3 may be respectively 39 [nsec], 40 [nsec] and 41 [nsec], which may further respectively cover ranges of 38.5 [nsec] or greater and less than 39.5 [nsec]; 39.5 [nsec] or greater and less than 40.5 [nsec]; and 40.5 [nsec] or greater and less then 41.5 [nsec]. Further, the peak amplitudes Vs1, Vs2 and Vs3 may be respectively, 0.3[V], 0.4[V] and 0.5[V], which may further respectively cover ranges of 0.25[V] or greater and less than 0.35[V]; 0.35[V] or greater and less than 0.45[V]; and 0.45[V] or greater and less than 0.55[V].

The reflected wave arrival time Da1=Da4=Da7 may be 58.5 [nsec], Da2=Da5=Da8 may be 60 [nsec], and Da3=Da6=Da9 may be 61.5 [nsec]. Further, the peak amplitude Va1=Va2=Va3 may be 0.33[V], Va4=Va5=Va6 may be 0.44[V], and Va7=Va8=Va9 may be 0.55[V]. The pulse width Wa1=Wa2=Wa3 may be 0.9 [nsec], Wa4=Wa5=Wa6 may be 1 [nsec], and Wa7=Wa8=Wa9 may be 1.1 [nsec]. These values may be preliminarily obtained by simulation.

In FIGS. 7 and 8, the controller 5 includes a calculating apparatus 35 and the register 36. The controller 5 outputs an enable signal to the reflected wave detector 4. The controller 5 selects from the reflected-wave cancelling information 34, a reflected wave arrival time Tsx corresponding to the detected values of the reflected-wave arrival time detector 32 and stores as the reflected wave arrival time Ts to the register 36, the selected reflected-wave arrival time Tsx.

The controller 5 is connected to the first switch 42 and the driver 2. The first switch 42 is inserted between the input terminal 6 of the electronic component 1 and the input terminus of the driver 2. The controller 5 outputs a test signal through the first switch 42 to the driver 2. The controller 5 outputs a switch signal that controls the switching of the first switch 42. The first switch 42, based in the switch signal from the controller 5, selects any one among the test signal and the input signal from the input terminal 6 of the electronic component 1 and supplies the selected signal to the driver 2.

The calculating apparatus 35 uses the combination of the reflected wave arrival time Ts and the peak amplitude Vs stored in the register 36 as a key and extracts from the reflected-wave cancelling information 34, a corresponding reflected wave arrival time Dyz, peak amplitude Vyz and pulse width Wyz. The calculating apparatus 35, based on the readout reflected wave arrival time Dyz, peak amplitude Vyz and pulse width Wyz, generates signals that set the reflected wave arrival time Dyz, the peak amplitude Vyz and the pulse width Wyz of the signal 25 (refer to FIG. 6) that inhibits the reflected wave 24.

The controller 5 outputs to a delay element 39 of the driver 2, the generated signal that sets the reflected wave arrival time Dyz. The controller 5 outputs to a pulse generator 40 of the driver 2, the generated signal that sets the pulse width Wyz. The controller 5 outputs to an adder 41 of the driver 2, the generated signal that sets the peak amplitude Vyz.

The controller 5 outputs a switch signal that controls the opening and closing of a second switch disposed in the driver 2. The controller 5, when the test signal is supplied to the driver 2, sets the first switch 42 to the test signal side and opens a second switch 38. Consequently, the test signal is supplied to a driver main body 37 disposed in the driver 2, but not to the delay element 39 side of the driver 2. Accordingly, while the test signal is supplied to the driver main body 37, the signal that inhibits the reflected wave is not generated.

The controller 5, when an input signal (actual signal) from the input terminal 6 is input to the driver 2, sets the first switch 42 to the actual signal side and closes the second switch 38. Consequently, the actual signal from the input terminal 6 is supplied to both the driver main body 37 and the delay element 39 side of the driver 2. Consequently, while the actual signal is supplied to the driver main body 37, a signal to inhibit the reflected wave is generated.

The functions and operations of the controller 5 may be implemented by hardware or may by implemented by executing on the calculating apparatus 35, a program that realizes the functions and operations of the controller 5. Here, the functions and the operations of the controller 5 are assumed to be implemented by the execution of a program realizing the respective functions and operation, and consequent to the execution of the program, operations for extracting and setting the reflected-wave cancelling information will be described hereinafter. The program, for example, may be stored in the storage device 3.

The electronic component 1, each time the power is turned on or reset, detects a reflected wave from each reception apparatus via the reflected wave detector 4, and sets a reflected wave arrival time Dyz, a peak amplitude Vyz and a pulse width Wyz for a signal that inhibits the reflected wave for the actual signal. The electronic component 1, each time a timing signal from the timer 8 is input into the controller 5, i.e., at constant intervals, performs the same operations and may correct the arrival time Dyz, the peak amplitude Vyz and the pulse width Wyz of the reflected signal of the signal that inhibits the reflected signal for the actual signal. Overall operations of the electronic component 1 will be described hereinafter.

The driver 2 includes the driver main body 37, the second switch 38, the delay element 39, the pulse generator 40 and the adder 41. The second switch 38 is connected to the input terminus of the driver 2. The second switch 38 opens and closes based on a switch signal from the controller 5.

The input terminus of the driver main body 37 is connected to the input terminus of the driver 2. The driver main body 37, based on the actual signal that is input thereto from the input terminal 6, outputs a voltage signal that is applied to the reception apparatuses A11 to D14 (e.g., a voltage signal that drives memory). The driver main body 37, based on the test signal input thereto from the controller 5, outputs a signal having a test pattern for measuring the reflected wave by the reflected wave detector 4.

The test pattern may be a bit count such that the same signal value is after a rising edge or a falling edge, and a waveform of successive step forms. Here, description will be given where a step form is the rising edge.

The delay element 39 is connected to the second switch 38 and the controller 5. The delay element 39 delays the actual signal from the input terminal 6, by the reflected wave arrival time Dyz. An example of the delay element 39 will be described hereinafter.

The pulse generator 40 is connected to the delay element 39 and the controller 5. The pulse generator 40 generates from the signal delayed by the delay element 39, a pulse signal of the pulse width Wyz. An example of the pulse generator 40 will be described hereinafter.

The adder 41 is connected to the output terminus of the driver main body 37, the pulse generator 40, and the controller 5. The adder 41 adjusts to the peak amplitude Vyz, the amplitude of the pulse signal generated by the pulse generator 40. The adder 41 adds the amplitude-adjusted pulse signal and the output signal of the driver main body 37, and outputs the resulting signal to the output terminal 7 of the electronic component 1. An example of the adder 41 will be described hereinafter.

Figure 10:
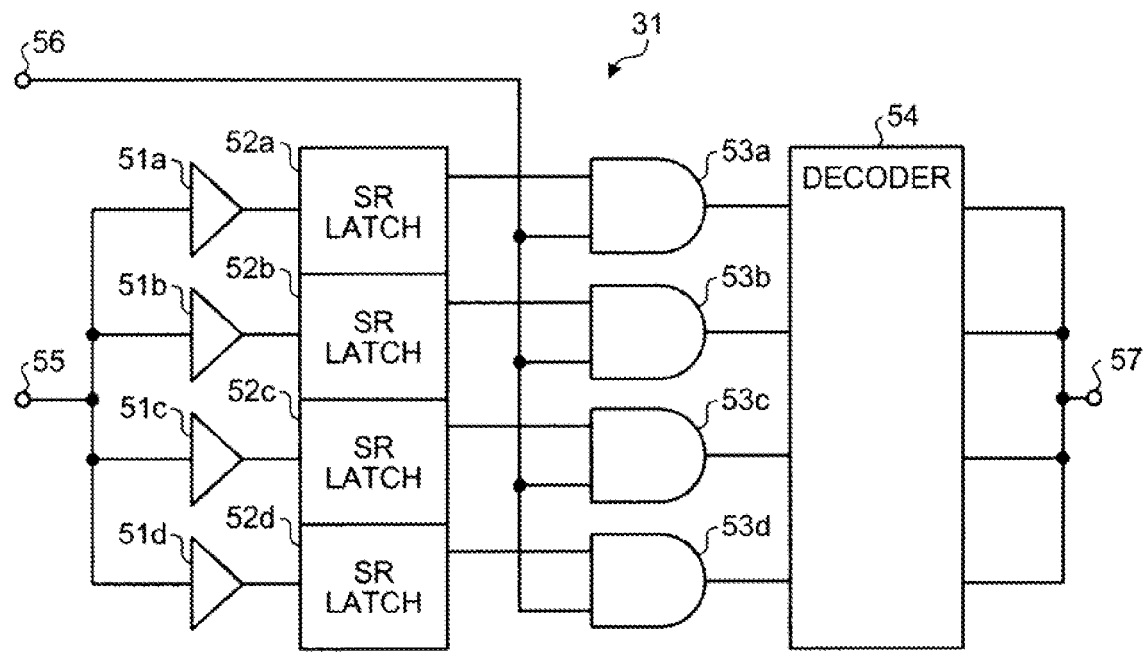
FIG. 10 is a block diagram depicting an example of a peak amplitude detector according to the second embodiment.

FIG. 10 is a block diagram depicting an example of the peak amplitude detector according to the second embodiment. As depicted in FIG. 10, the peak amplitude detector 31, for example, includes multiple comparators 51a to 51d, multiple SR latch circuits 52a to 52d, multiple AND circuits 53a to 53d, and a decoder 54.

The comparators 51a to 51d, the SR latch circuits 52a to 52d, and the AND circuits 53a to 53d are provided in quantities equivalent to the number of peak amplitude thresholds. In the second embodiment, for example, the peak amplitude is judged according to 4 thresholds including 0.9V, 0.8V, 0.7V, and 0.6V. Therefore, 4 of the comparators 51a to 51d, the SR latch circuits 52a to 52d, and the AND circuits 53a to 53d are respectively provided.

Each of the input termini of the comparators 51a to 51d are connected to an input terminal 55 of the peak amplitude detector 31. The comparators 51a to 51d receive from the input terminal 55, the input of a reflected wave that has been reflected by the reception apparatus A11. The comparators 51a to 51d have mutually different voltage thresholds, and compare the voltage value of the reflected wave with the voltage threshold thereof. The comparators 51a to 51d, for example, may output 1 if the voltage value of the reflected wave is greater than or equal to the voltage threshold thereof, and may output 0 if the voltage value of the reflected wave is less than the voltage threshold thereof.

The first SR latch circuit 52a is connected to the output terminus of the first comparator 51a. The second SR latch circuit 52b is connected to the output terminus of the second comparator 51b. The third SR latch circuit 52c is connected to the output terminus of the third comparator 51c. The fourth SR latch circuit 52d is connected to the output terminus of the fourth comparator 51d. The SR latch circuits 52a to 52d latch the output values of the corresponding comparator 51a to 51d.

The first AND circuit 53a is connected to the first SR latch circuit 52a and an input terminal 56 for an enable signal from the controller 5. The second AND circuit 53b is connected to the second SR latch circuit 52b and the input terminal 56 for the enable signal. The third AND circuit 53c is connected to the third SR latch circuit 52c and the input terminal 56 for the enable signal. The fourth AND circuit 53d is connected to the second SR latch circuit 52b and the input terminal 56 for the enable signal.

The first AND circuit 53a, during the period that the enable signal is asserted, outputs the value latched to the first SR latch circuit 52a. The second AND circuit 53b, the third AND circuit 53c, and the fourth AND circuit 53d similarly output values. Accordingly, the period during which the enable signal is asserted, is the period for measuring the reflected wave.

The decoder 54 is connected to the output termini of the AND circuits 53a to 53d. The decoder 54 outputs to an output terminal 57 of the peak amplitude detector 31, digital values that correspond to the output values of the AND circuits 53a to 53d. The digital values output from the decoder 54 are stored to the register 36 of the controller 5 as the peak amplitude Vs of the reflected wave detected by the peak amplitude detector 31. The digital values output from the decoder 54 are passed, as the select signal, to the reflected-wave arrival time detector 32.

Here, the timing at which the reflected wave measurement is started, for example, may be a time after a signal that has been output from the driver 2 based on the test signal, reaches the reception apparatus A11. The reason for this is that when the reflected wave that is reflected by the reception apparatus A11 reaches the peak amplitude detector 31, reflected wave measurement by the peak amplitude detector 31 has already been started and therefore, the peak amplitude detector 31 can assuredly detect the reflected wave from the reception apparatus A11.

The timing at which the reflected wave measurement is terminated, for example, may be a time immediately before the reflected wave from the reception apparatus B12 nearest the driver 2 after the reception apparatus A11 reaches the peak amplitude detector 31. The reason for this is that the peak amplitude detector 31 can be prevented from detecting the reflected wave from the reception apparatus B12.

Preferably, the period for measuring the reflected wave, for example, may be a period on the order of a few percent sandwiching (before and after) an estimated value t of the arrival time of the reflected wave 22, whereby the peak amplitude detector 31 can be prevented from detecting unnecessary components such as exogenous noise.

Figure 11:
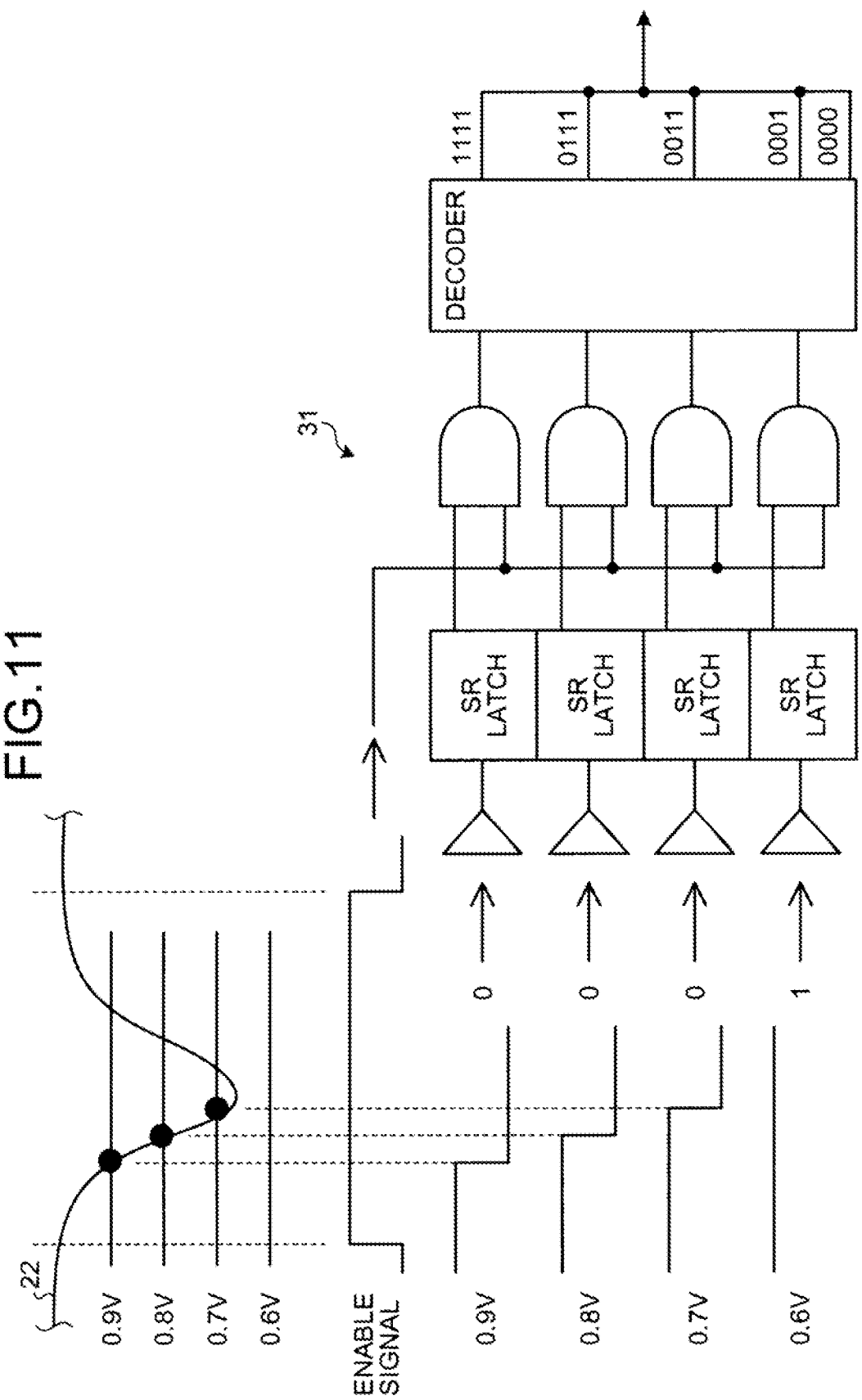
FIG. 11 is a diagram depicting an example of operations of the peak amplitude detector according to the second embodiment.

FIG. 11 is a diagram depicting an example of operations of the peak amplitude detector according to the second embodiment. In FIG. 11, the upper left portion depicts the waveform of the reflected wave 22 that is from the reception apparatus A11 and arises consequent to the test signal; and the lower left portion depicts operations of the comparators 51a to 51d. As depicted in FIG. 11, the voltage thresholds of the first comparator 51a, the second comparator 51b, the third comparator 51c, and the fourth comparator 51d, may be, for example, 0.9V, 0.8V, 0.7V, and 0.6V, respectively, though not particularly limited hereto.

In the example depicted in FIG. 11, the peak amplitude voltage value of the reflected wave 22 is lower than 0.7V, but not lower than 0.6V and consequently, the first comparator 51a, the second comparator 51b, and the third comparator 51c each output 0, and the fourth comparator 51d outputs 1.

Accordingly, the output values of the first AND circuit 53a, the second AND circuit 53b, and the third AND circuit 53c are each 0 and the output value of the fourth AND circuit 53d is 1. In this case, for example, the decoder 54 may output a digital value of "0001".

Further, if the peak amplitude voltage value of the reflected wave 22 is less than 0.6V, the first comparator 51a, the second comparator 51b, the third comparator 51c, and the fourth comparator 51d each output 0. Accordingly, the output values of the first AND circuit 53a, the second AND circuit 53b, the third AND circuit 53c, and the fourth AND circuit 53d are 0. In this case, for example, the decoder 54 may output a digital value of "0000".

If the peak amplitude voltage value of the reflected wave 22 is lower than 0.8V and greater than or equal to 0.7V, the first comparator 51a and the second comparator 51b each output 0, and the third comparator 51c and the fourth comparator 51d each output 1. Accordingly, the output values of the first AND circuit 53a and the second AND circuit 53b are each 0, and the output values of the third AND circuit 53c and the fourth AND circuit 53d are each 1. In this case, for example, the decoder 54 may output a digital value of "0011".

If the peak amplitude voltage value of the reflected wave 22 is less than 0.9V and greater than or equal to 0.8V, the first comparator 51a outputs 0, and the second comparator 51b, the third comparator 51c and the fourth comparator 51d each output 1. Accordingly, the output value of the first AND circuit 53a is 0, and the output values of the second AND circuit 53b, the third AND circuit 53c and the fourth AND circuit 53d are each 1. In this case, for example, the decoder 54 may output a digital value of "0111".

If the peak amplitude voltage value of the reflected wave 22 is greater than or equal to 0.9V, the first comparator 51a, the second comparator 51b, the third comparator 51c, and the fourth comparator 51d each output 1. Accordingly, the output values of the first AND circuit 53a, the second AND circuit 53b, the third AND circuit 53c, and the fourth AND circuit 53d are each 1. In this case, for example, the decoder 54 may output a digital value of "1111".

Figure 12:
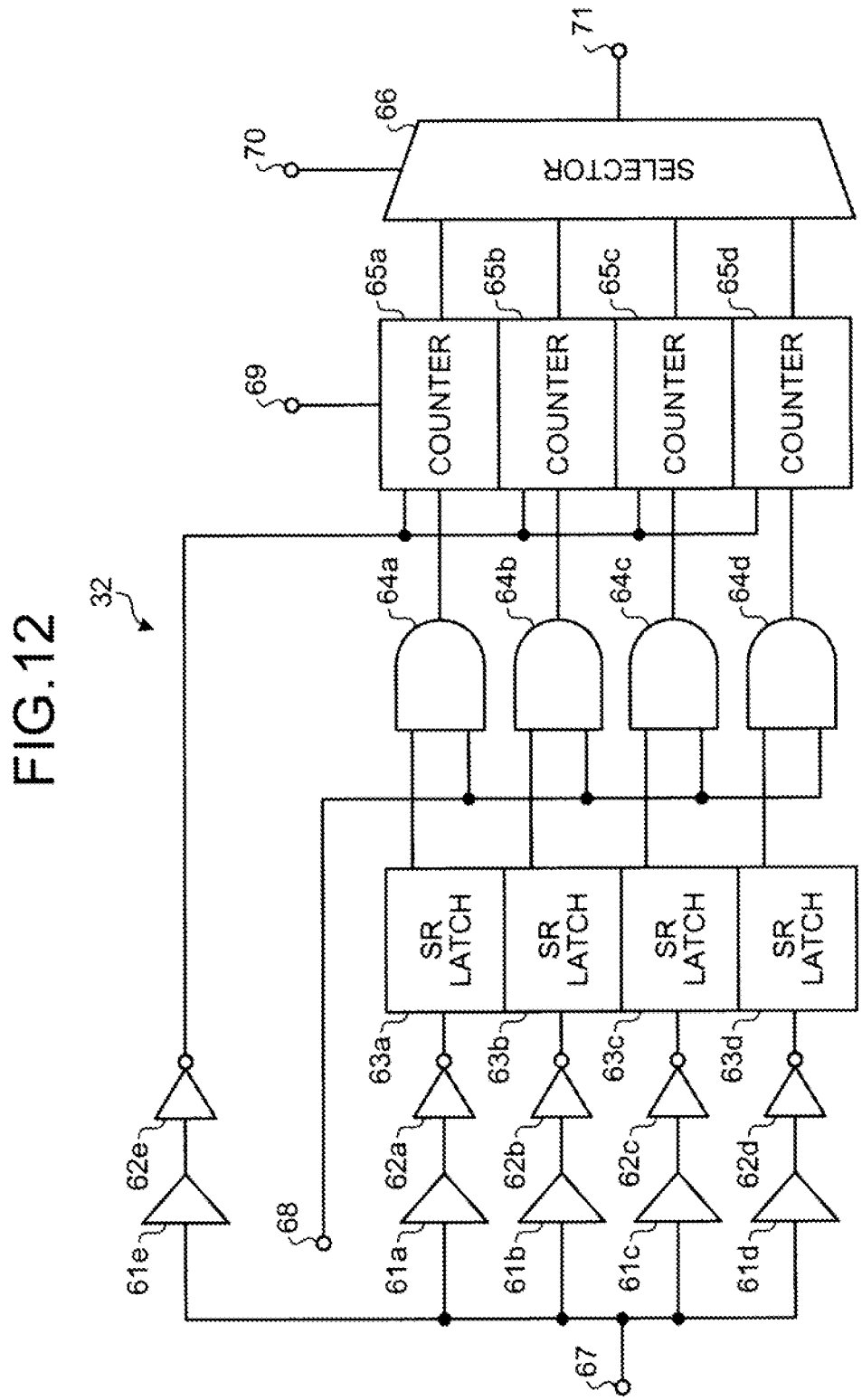
FIG. 12 is a block diagram depicting an example of a reflected-wave arrival time detector according to the second embodiment.

FIG. 12 is a block diagram depicting an example of the reflected-wave arrival time detector according to the second embodiment. As depicted in FIG. 12, the reflected-wave arrival time detector 32 includes, for example, multiple comparators 61a to 61e, multiple inverters 62a to 62e, multiple SR latch circuits 63a to 63d, multiple AND circuits 64a to 64d, multiple counters 65a to 65d, and a selector 66.

Stop signals of a quantity equivalent to the number of peak amplitude thresholds are generated by the fifth to the eighth comparators 61a to 61d, the first to the fourth inverters 62a to 62d, the fifth to the eighth SR latch circuits 63a to 63d, and the fifth to the eighth AND circuits 64a to 64d. The stop signals suspend counting by the first to the fourth counters 65a to 65d. The ninth comparator 61e and the fifth inverter 62e generate start signals that start the counting by the first to the fourth counters 65a to 65d.

Each input termini of the comparators 61a to 61e is connected to the input terminal 67 of the reflected-wave arrival time detector 32. The comparators 61a to 61e receive from the input terminal 67, an input of the reflected wave that has returned after being reflected by the reception apparatus A11. The fifth to the eighth comparators 61a to 61d have mutually different voltage thresholds, and compare the voltage value of the reflected wave with the voltage threshold thereof. The fifth to the eighth comparators 61a to 61d, for example, may output 1 if the voltage value of the reflected wave is greater than or equal to the threshold thereof and may output 0 if the voltage value of the reflected wave is less than the voltage threshold thereof.

The ninth comparator 61e, for example, may output 1 if the amplitude of the rising edge of a signal output from the driver 2 based on the test signal the driver 2, is less than 50% of the peak value, and if the amplitude is greater than or equal to 50% of the peak value, may output 0 until the falling edge of the signal.

The first inverter 62a is connected to the output terminus of the fifth comparator 61a. The second inverter 62b is connected to the output terminus of the sixth comparator 61b. The third inverter 62c is connected to the output terminus of the seventh comparator 61c. The fourth inverter 62d is connected to the output terminus of the eighth comparator 61d. The fifth inverter 62e is connected to the output terminus of the ninth comparator 61e. The inverters 62a to 63e invert the output value of the corresponding comparator 61a to 61e to 1 when the output value is 0, and invert the output value to 0 when the output value is 1.

The fifth SR latch circuit 63a is connected to the output terminus of the first inverter 62a. The sixth SR latch circuit 63b is connected to the output terminus of the second inverter 62b. The seventh SR latch circuit 63c is connected to the output terminus of the third inverter 62c. The eighth SR latch circuit 63d is connected to the output terminus of the fourth inverter 62d. The SR latch circuits 63a to 63d latch the output value of the corresponding inverter 62a to 62d.

The fifth AND circuit 64a is connected to the fifth SR latch circuit 63a and the input terminal 68 for the enable signal from the controller 5. The sixth AND circuit 64b is connected to the sixth SR latch circuit 63b and the input terminal 68 for the enable signal. The seventh AND circuit 64c is connected to the seventh SR latch circuit 63c and the input terminal 68 for the enable signal. The eighth AND circuit 64d is connected to the eighth SR latch circuit 63d and the input terminal 68 for the enable signal.

The fifth AND circuit 64a, during the period that the enable signal is asserted, i.e., for the reflected wave measurement period, outputs the value latched to the fifth SR latch circuit 63a. The sixth AND circuit 64b, the seventh AND circuit 64c, and the eighth AND circuit 64d perform similar output.

The first counter 65a is connected to the output terminus of the fifth inverter 62e, an input terminal 69 for the clock signal, and the output terminus of the fifth AND circuit 64a. The second counter 65b is connected to the output terminus of the fifth inverter 62e, the input terminal 69 for the clock signal, and the output terminus of the sixth AND circuit 64b. The third counter 65c is connected to the output terminus of the fifth inverter 62e, the input terminal 69 for clock signal, and the output terminus of the seventh AND circuit 64c. The fourth counter 65d is connected to the output terminus of the fifth inverter 62e, the input terminal 69 for the clock signal, and the output terminus of the eighth AND circuit 64d.

The first counter 65a begins clock counting according to the start signal output from the fifth inverter 62e. For example, at a timing where upon the amplitude of the rising edge of a signal output from the driver 2 based on the test signal, reaching 50%, the output value of the ninth comparator 61e changes from 1 to 0. Accordingly, the output value of the fifth inverter 62e changes from 0 to 1.

The first counter 65a, at a timing when the output value of the fifth inverter 62e, i.e., the value of the start signal changes from 0 to 1, begins clock counting. The second counter 65b, the third counter 65c, and the fourth counter 65d similarly begin counting.

The first counter 65a suspends clock counting, according to a stop signal output from the fifth AND circuit 64a. The output value of the fifth comparator 61a changes from 1 to 0 at a timing when the voltage value of the reflected wave become less than the voltage threshold of the fifth comparator 61a. Accordingly, the output value of the first inverter 62a changes from 0 to 1. Consequently, the output value of the fifth AND circuit 64a, during the period that the enable signal is asserted, i.e., during the period for measuring the reflected wave, changes from 0 to 1.

The first counter 65a suspends clock counting at a timing when the output value of the fifth AND circuit 64a, i.e., the value of the stop signal, changes from 0 to 1. The second counter 65b, the third counter 65c, and the fourth counter 65d similarly suspend clock counting.

The selector 66 is connected to the output termini of the counters 65a to 65d and to an input terminal 70 for the select signal. The input terminal 70 for the select signal receives from the decoder 54 of the peak amplitude detector 31, the input of the select signal. The selector 66, based on the value of the select signal, selects one of the counters 65a to 65d. The selector 66 outputs to the output terminal 71 of the reflected-wave arrival time detector 32, the value of the selected counter. The value output from the selector 66 is passed to the controller 5, as the detected value of the reflected wave arrival time detected by the reflected-wave arrival time detector 32.

Figure 13:
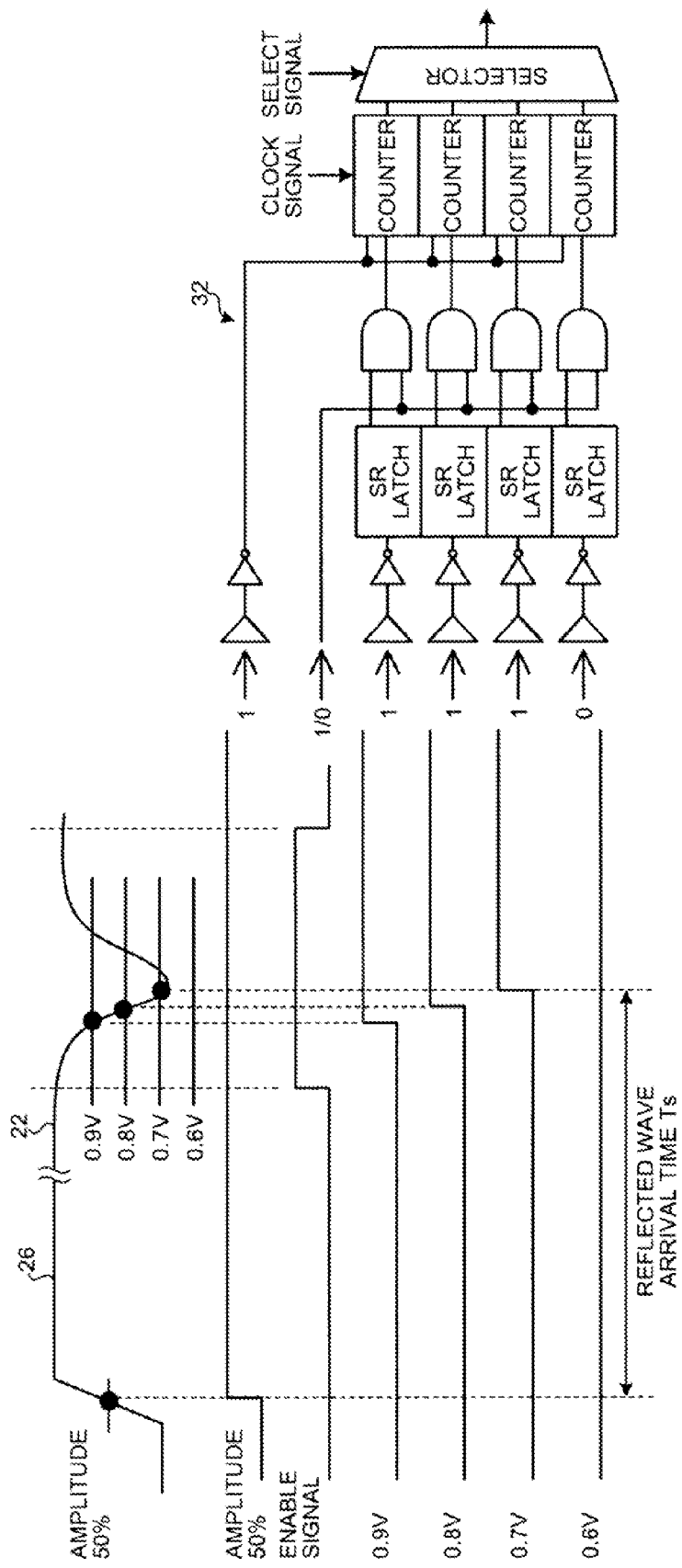
FIG. 13 is a diagram depicting operations of the reflected-wave arrival time detector according to the second embodiment.

FIG. 13 is a diagram depicting operations of the reflected-wave arrival time detector according to the second embodiment. In FIG. 13, the upper left portion depicts the waveforms of a test signal 26 and the reflected wave 22 from the reception apparatus A11; and the lower left portion depicts operations by the comparators 61a to 61d and the inverters 62a to 62d. As depicted in FIG. 13, the voltage thresholds of the fifth comparator 61a, the sixth comparator 61b, the seventh comparator 61c, and the eighth comparator 61d may be, for example, 0.9V, 0.8V, 0.7V, and 0.6V, though not particularly limited hereto.

In the example depicted in FIG. 13, the counters 65a to 65d start counting at a timing when the amplitude of the rising edge of the test signal reaches, for example 50%. Subsequently, during the period that the enable signal is asserted (i.e., during the period for measuring the reflected wave 22) and at a timing when the voltage value of the reflected wave 22 reaches 0.9V, the output value of the fifth comparator 61a changes from 1 to 0. Accordingly, the output value of the first inverter 62a changes from 0 to 1. Consequently, the output value of the fifth AND circuit 64a becomes 1 and the first counter 65a suspends counting.

Subsequently, during the period in which the enable signal is asserted and at a timing when the voltage value of the reflected wave 22 reaches 0.8V, the second counter 65b suspends counting. During the period in which the enable signal is asserted and at a timing when the voltage value of the reflected wave 22 reaches 0.7V, the third counter 65c suspends counting.

During the period in which the enable signal is asserted and upon the voltage value of the reflected wave 22 reaching 0.6V, the fourth counter 65d suspends counting at a timing when the voltage value reaches 0.6V. In the example depicted in FIG. 13, although the peak amplitude voltage value of the reflected wave 22 has become less than 0.7V, the voltage value is not less than 0.6V and therefore, the fourth counter 65d does not suspend counting.

For example, when the value of the select signal from the decoder 54 is "0001", the selector 66 may output the output value of the fourth counter 65d, as the detected value of the reflected wave arrival time detected by the reflected-wave arrival time detector 32. When the value of the select signal is "0011", the selector 66 may output the output value of the third counter 65c. When the value of the select signal is "0111", the selector 66 may output the output value of the second counter 65b. When the value of the select signal is "1111", the selector 66 may output the output value of the first counter 65a.

Figure 14:
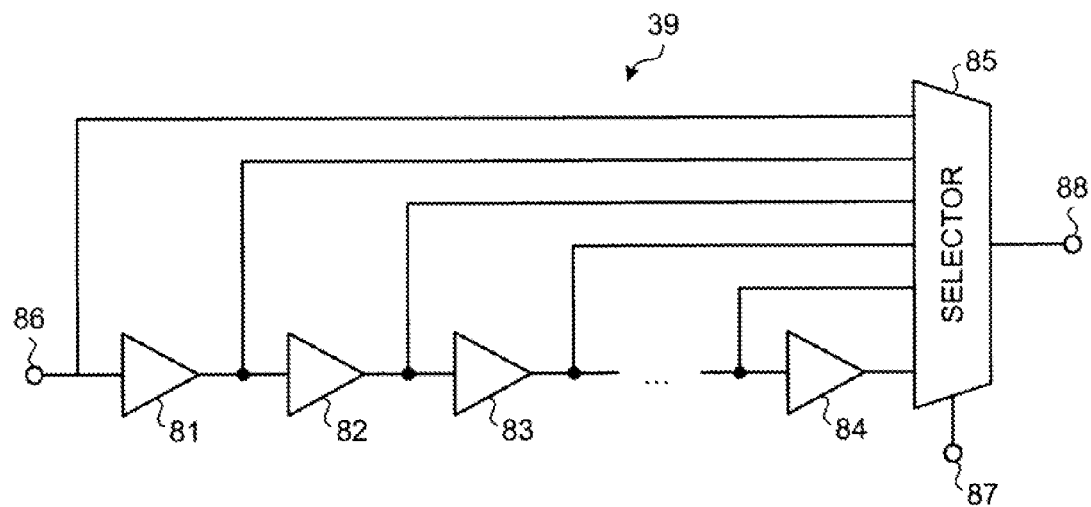
FIG. 14 is a block diagram depicting an example of a delay element according to the second embodiment.

FIG. 14 is a block diagram depicting an example of the delay element according to the second embodiment. As depicted in FIG. 14, the delay element 39 includes serially connected buffers 81 to 84 and a selector 85. A signal input to an input terminal 86 of the delay element 39 is delayed at each passing through each of the buffers 81 to 84. The selector 85 receives an input of signals output from the buffers 81 to 84. The selector 85, from among the signals from the buffers 81 to 84, selects a signal that has been delayed by an amount corresponding to a signal that is input from the controller 5 into an input terminal 87 and that sets the reflected wave arrival time Dyz. The selector 85 outputs the selected signal to an output terminal 88 of the delay element 39.

Figure 15:
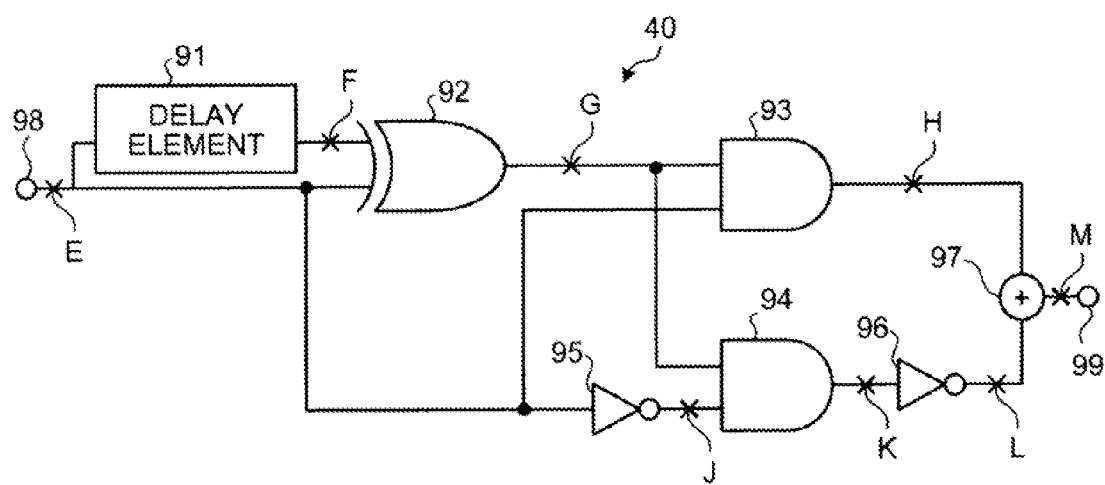
FIG. 15 is a block diagram depicting an example of a pulse generator according to the second embodiment.
Figure 16:
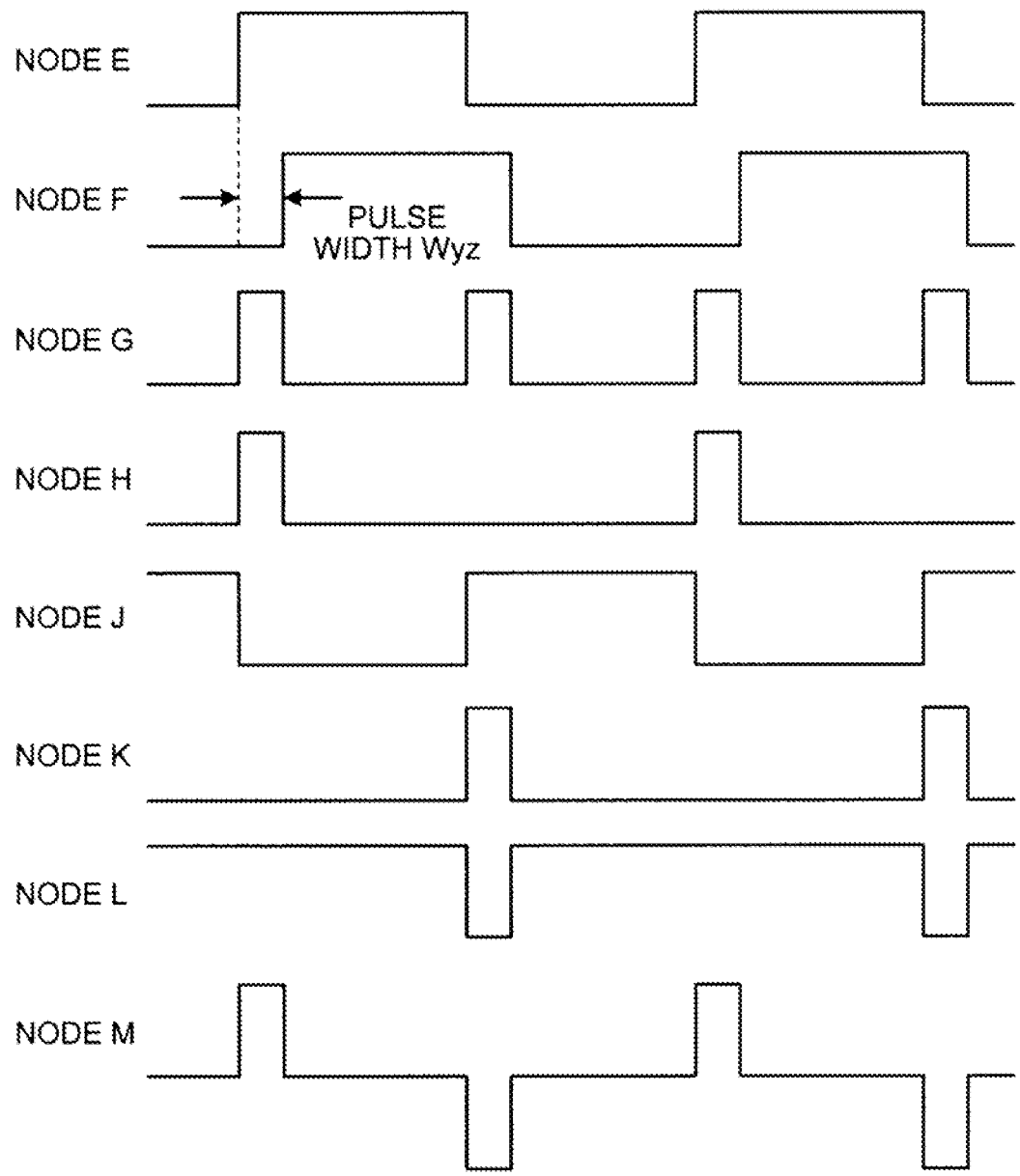
FIG. 16 is a diagram depicting an example of operations of the pulse generator according to the second embodiment.

FIG. 15 is a block diagram depicting an example of the pulse generator according to the second embodiment. FIG. 16 is a diagram depicting an example of operations of the pulse generator according to the second embodiment. In FIG. 15, for the sake of convenience, reference characters E to H, and J to M represent nodes. FIG. 16 depicts waveforms occurring at each of the nodes E to H, and J to M.

As depicted in FIG. 15, the pulse generator 40 includes a delay element 91, an exclusive OR circuit (XOR circuit) 92, 2 AND circuits 93 and 94, 2 inverters 95 and 96, and an adder circuit 97. The delay element 91 may be identical to the delay element 39 upstream from the pulse generator 40.

The input terminus of the delay element 91 and an input terminus of the exclusive OR circuit 92 are connected to an input terminal 98 (node E) of the pulse generator 40. The other input terminus of the exclusive OR circuit 92 (node F) is connected to the output terminus of the delay element 91.

Consequently, from the output terminus (node G) of the exclusive OR circuit 92, an input signal to the pulse generator 40, i.e., the exclusive OR of the output signal of the delay element 39 upstream from the pulse generator 40 and the signal obtained by further delaying this output signal of the delay element 39 by the delay element 91 of the pulse generator 40 is output. In other words, as depicted in FIG. 16, the exclusive OR circuit 92 outputs a pulse signal having a pulse width Wyz that is determined by the amount of delay induced by the delay element 91 of the pulse generator 40. The amount of delay induced by the delay element 91 is determined by a signal that is input to the delay element 91 from the controller 5 and that sets the pulse width Wyz.

An input terminus of the ninth AND circuit 93 is connected to the output terminus of the exclusive OR circuit 92. The other input terminus of the ninth AND circuit 93 is connected to the input terminal 98 of the pulse generator 40. Consequently, among the pulse signals generated by the exclusive OR circuit 92, the pulse signal when the input signal to the pulse generator 40 is 1 is output from the output terminus (node H) of the ninth AND circuit 93.

The input terminus of the sixth inverter 95 is connected to the input terminal 98 of the pulse generator 40. Consequently, an inverted signal of the input signal to the pulse generator 40 is output from the output terminus (node J) of the sixth inverter 95.

An input terminus of the tenth AND circuit 94 is connected to the output terminus of the exclusive OR circuit 92. The other input terminus of the tenth AND circuit 94 is connected to the output terminus of sixth inverter 95. Consequently, among the pulse signals generated by the exclusive OR circuit 92, the pulse signal when the input signal to the pulse generator 40 is 0 is output from the output terminus (node K) of the tenth AND circuit 94.

The input terminus of the seventh inverter 96 is connected to the output terminus of the tenth AND circuit 94. Consequently, an inverted signal of the pulse signal that is output from the tenth AND circuit 94 is output from the output terminus (node L) of the seventh inverter 96.

The adder circuit 97 combines the output signal of the ninth AND circuit 93 and the output signal of the seventh inverter 96, generates a bipolar pulse signal and outputs the generated bipolar pulse signal to an output terminal 99 (node M) of the pulse generator 40.

Figure 17:
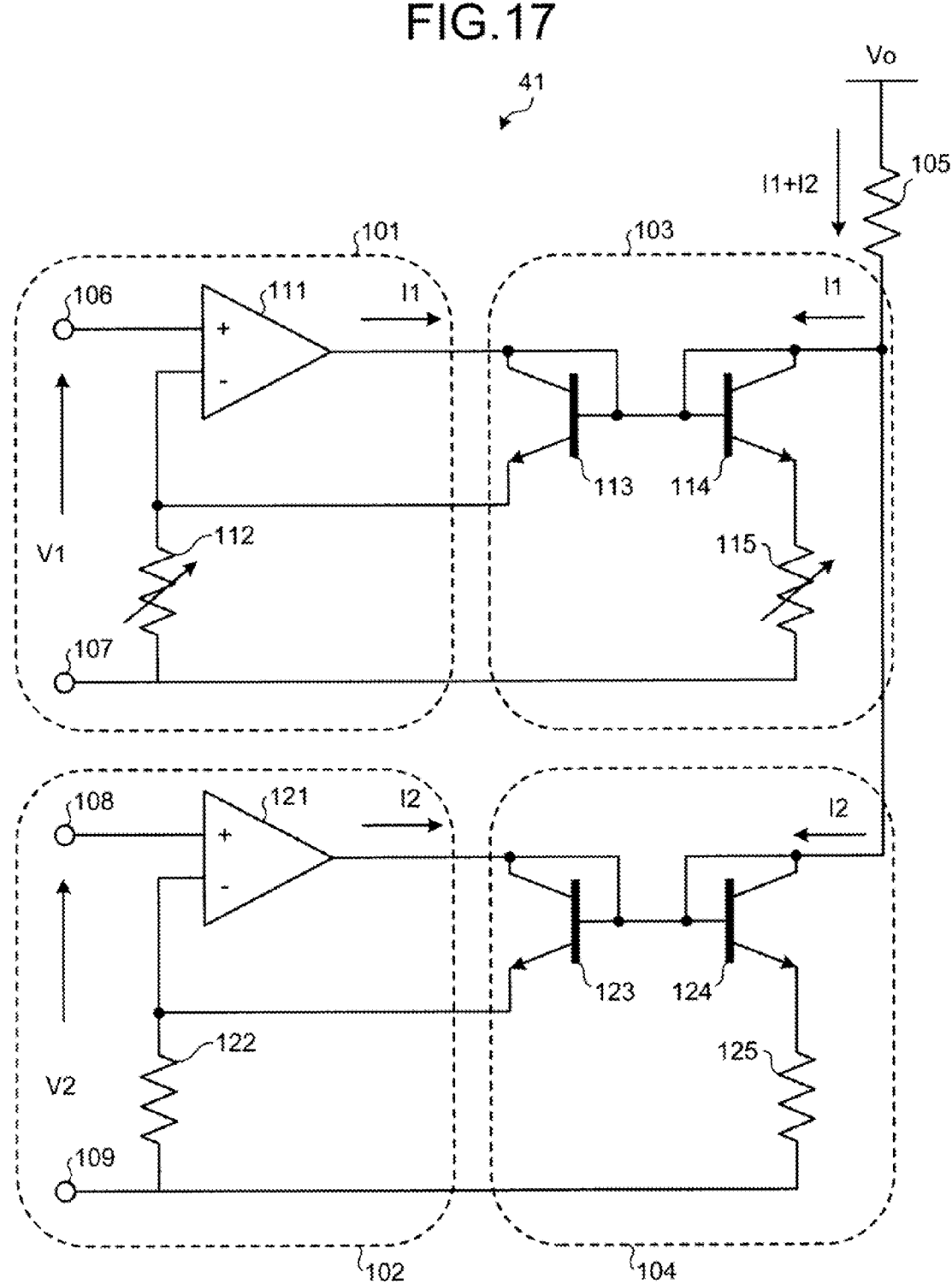
FIG. 17 is a block diagram depicting an example of an adder according to the second embodiment adder.

FIG. 17 is a block diagram depicting an example of the adder according to the second embodiment adder. As depicted in FIG. 17, the adder 41 includes a first constant current circuit 101, a second constant current circuit 102, a first current mirror circuit 103, and a second current mirror circuit 104.

The first constant current circuit 101, based on a voltage signal output from the pulse generator 40, outputs a constant current I1 to the first current mirror circuit 103. The first constant current circuit 101 includes a first operational amplifier 111 and a first variable resistor 112.

The non-inverting input terminal of the first operational amplifier 111 is connected to a first input terminal 106 of the adder 41. The output voltage of the pulse generator 40 is applied to the first input terminal 106. The inverting input terminal of the first operational amplifier 111 is connected to a terminus of the first variable resistor 112. The other terminus of the first variable resistor 112 is connected to an earth terminal 107. The output terminal of the first operational amplifier 111 is connected to the collector and the base of a first transistor 113 disposed in the first current mirror circuit 103.

The first current mirror circuit 103 includes the first transistor 113, a second transistor 114, and a second variable resistor 115. The emitter of the first transistor 113 is connected to the inverting input terminal of the first operational amplifier 111.

The collector of the second transistor 114 is connected to the base of the second transistor 114, the base of the first transistor 113, and a terminus of a first resistor 105. The other terminus of the first resistor 105 is connected to a power source terminal. The emitter of the second transistor 114 is connected to a terminus of the second variable resistor 115. The other terminus of the second variable resistor 115 is connected to the earth terminal 107.

The second constant current circuit 102, based on the voltage signal output from the driver main body 37, outputs a constant current I2 to the second current mirror circuit 104. The second constant current circuit 102 includes a second operation amplifier 121 and a second resistor 122.

The non-inverting input terminal of the second operation amplifier 121 is connected to a second input terminal 108 of the adder 41. The output voltage of the driver main body 37 is applied to the second input terminal 108. The inverting input terminal of the second operation amplifier 121 is connected to a terminus of the second resistor 122. The other terminus of the second resistor 122 is connected to an earth terminal 109. The output terminal of the second operation amplifier 121 is connected to the collector and the base of a third transistor 123 disposed in the second current mirror circuit 104.

The second current mirror circuit 104 includes the third transistor 123, a fourth transistor 124, and a third resistor 125. The emitter of the third transistor 123 is connected to the inverting input terminal of the second operation amplifier 121.

The collector of the fourth transistor 124 is connected to the base of the fourth transistor 124, the base of the third transistor 123, and a terminus (the collector of the second transistor 114) of the first resistor 105. The emitter of the fourth transistor 124 is connected to a terminus of the third resistor 125. The other terminus of the third resistor 125 is connected the earth terminal 109.

When the current I1 is supplied to the first transistor 113 of the first current mirror circuit 103 by the first constant current circuit 101, the current I1 also flows through the second transistor 114 of the first current mirror circuit 103. The current I1 is determined by the resistance value of the first variable resistor 112 and the second variable resistor 115. The resistance value of the first variable resistor 112 and the second variable resistor 115 is adjusted by a signal that is input to the adder 41 from the controller 5 and that sets the peak amplitude Vyz.

When the current I2 is supplied to the third transistor 123 of the second current mirror circuit 104 by the second constant current circuit 102, the current I2 also flows through the fourth transistor 124 of the second current mirror circuit 104. Consequently, a current (I1+I2) that is the sum of the currents I1 and I2 flows through the first resistor 105. As a result, voltage Vo, which is a sum of the voltage of the actual signal output from the driver main body 37 and the voltage of the pulse signal that inhibits the reflected wave, arises at the first resistor 105.

FIG. 18 is a flowchart of overall operations of the electronic component according to the second embodiment. As depicted in FIG. 18, when the power source of the electronic component 1 is turned on or when the electronic component 1 is restarted, the controller 5 sets the first switch 42 to the test signal side and opens the second switch 38, and thereby transmits a test signal to the driver 2. Consequently, the driver main body 37 transmits to the reception apparatus A11, a signal having a step waveform test pattern (step S11).

The reflected wave detector 4 detects a reflected wave that returns when the test pattern signal transmitted from the driver main body 37 is reflected back by the reception apparatus A11 (step S12). Here, the peak amplitude detector 31 detects the peak amplitude Vs of the reflected wave. The reflected-wave arrival time detector 32 detects the time that elapses until the reflected wave reaches the reflected-wave arrival time detector 32.

The controller 5 obtains the reflected wave arrival time Ts of the reflected wave, based on the detected value obtained by the reflected-wave arrival time detector 32. The calculating apparatus 35 extracts from the reflected-wave cancelling information 34 for the reception apparatus for which the reflected wave is to be inhibited, the reflected wave arrival time Dyz, the peak amplitude Vyz and the pulse width Wyz pertinent to the combination of the peak amplitude Vs and the reflected wave arrival time Ts. The calculating apparatus 35 determines the extracted values as pulse values for inhibiting the reflected wave (step S13).

The controller 5 sets the pulse values for inhibiting the reflected wave, into the delay element 39, the pulse generator 40 and the adder 41. The controller 5 sets the first switch 42 to the actual signal side and closes the second switch 38. Consequently, based on the actual signal input from the input terminal 6, the driver 2 transmits to the reception apparatus, a signal (composite wave) that is composite of the signal output by the driver main body 37 and the pulse signal that is for inhibiting the reflected wave and generated by the delay element 39, the pulse generator 40 and the adder 41 (step S14).

Upon the input of a timing signal into the controller 5 from the timer 8 after a given period has elapsed (step S15), similar to the operation at step S11, the electronic component 1 transmits to the reception apparatus A11, a signal having a step waveform test pattern (step S16). Similar to the operation at step S12, the reflected wave detector 4 detects a reflected wave and feeds back the detection result to the controller 5 (step S17).

Similar to the operation at step S13, based on the values fed back, the controller 5 determines the pulse values for inhibiting the reflected wave and as necessary, changes the pulse values (step S18). The flow returns to step S14 and thereafter, the operations at steps S14 to S18 are repeated until the power source of the electronic component 1 is turned off or the electronic component 1 is reset.

FIG. 19 is a flowchart of operations for extracting and setting reflected-wave cancelling information in the electronic component according to the second embodiment. At steps S12 to S13 and steps S17 to S18 in the flowchart depicted in FIG. 18, operations depicted in FIG. 19 are performed.

As depicted in FIG. 19, the peak amplitude detector 31 detects the peak amplitude Vs of a reflected wave and the reflected-wave arrival time detector 32 detects the time that elapses until the reflected wave reaches the reflected-wave arrival time detector 32 (step S21).

The controller 5 classifies the detected value obtained by the reflected-wave arrival time detector 32, as any one of multiple reflected wave arrival times Ts in the reflected-wave cancelling information 34 for the reception apparatus of the reflected wave to be inhibited (step S22). For example, if the value detected by the reflected-wave arrival time detector 32 is 39.2 [nsec], the detected reflected wave arrival time Ts may be classified as 39 [nsec] and if the detected value is 39.6 [nsec], the detected reflected wave arrival time Ts may be classified as 40 [nsec].

The calculating apparatus 35 extracts from the reflected-wave cancelling information 34 for the reception apparatus of the reflected wave that is to be inhibited, the reflected wave arrival time Dyz, the peak amplitude Vyz and the pulse width Wyz pertinent to the combination of the peak amplitude Vs and the reflected wave arrival time Ts (step S23).

The calculating apparatus 35 converts the extracted reflected wave arrival time Dyz into a value (selector value) that selects any one among the input signals from the buffers 81 to 84 at the selector 85 of the delay element 39 (step S24). The calculating apparatus 35 converts the extracted pulse width Wyz into the delay (delay value) at the delay element 91 of the pulse generator 40 (step S25). The calculating apparatus 35 converts the extracted peak amplitude Vyz into a variable resistance value of the first variable resistor 112 and the second variable resistor 115 of the adder 41 (step S26).

The controller 5 sets the converted selector value into the selector 85 of the delay element 39, sets the converted delay value into the delay element 91 of the pulse generator 40, and sets the converted variable resistance value into the first variable resistor 112 and the second variable resistor 115 of the adder 41. The controller 5 instructs execution by the first switch 42, the second switch 38, the delay element 39, the pulse generator 40, and the adder 41 (step S27).

In the operations above, the output destination of the actual signal from the driver 2 can be switched from the current reception apparatus (e.g., the reception apparatus A11) to another reception apparatus (e.g., the reception apparatus B12). In this case, the calculating apparatus 35 switches the reflected-wave cancelling information 34 that is to be referred to, from that of the current reception apparatus to that of the reception apparatus after the switch.

Consequent to the length of the bus 15 and the transmission speed of the signal, the reflected wave may occur 1-bit of the transmission waveform later and the signal that inhibits the reflected wave may be accordingly generated a few bits later. If the reflected-wave cancelling information 34 that the calculating apparatus 35 refers to is switched at the same timing as the switching of the output destination reception apparatus, a disadvantage arises in that the signal for inhibiting the reflected wave and output based on the reflected-wave cancelling information 34 for the reception apparatus before the switch becomes an unnecessary signal for the actual signal after the reception apparatus switch.

Thus, the calculating apparatus 35 may switch the reflected-wave cancelling information 34 (that is to be referred to) at a timing that is before the timing when the destination reception apparatus is switched. For example, the reflected-wave cancelling information 34 that is to be referred to is preferably switched at a timing when the signal for inhibiting the reflected wave of the previous reception apparatus is not being output from the driver 2.

In other words, the calculating apparatus 35 may be configured to switch the reflected-wave cancelling information 34 at a timing that is on the order of a few bits before the timing when the signal (for inhibiting the reflected wave of the reception apparatus before the switching) is output from the driver 2. As a result, a signal that is unnecessary for the actual signal after the reception apparatus switch can be prevented from being output from the driver 2.

FIG. 20 is a block diagram depicting an example of a motherboard. As depicted in FIG. 20, a central processing unit (CPU) 132 and a socket 133 are disposed on a motherboard 131. A memory controller 134 is provided in the CPU 132. A memory board 135 is attached to the socket 133. The electronic component 1, for example, may be disposed in the memory controller 134. Each of the reception apparatuses 11 to 14 may be disposed in the memory board 135. The socket may be disposed on the motherboard 131 in plural.

According to the second embodiment, the same effects of the first embodiment are obtained.

The pulse width Wyz need not be prescribed by the reflected-wave cancelling information 34. In this case, the pulse width may be preliminarily set to a given value.

The electronic component and the reflected-wave cancelling method can inhibit a reflected wave that is to be inhibited.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic component comprising:
a driver that outputs a signal to a reception apparatus;
a storage device storing therein reflection information related to a reflected wave that returns to the driver when the signal is reflected back by the reception apparatus;
a reflected wave detector that based on the reflection information, determines a measurement period for measuring the reflected wave and that based on the measurement period, measures an arrival time and a peak amplitude of the reflected wave; and a controller that based on the arrival time and the peak amplitude, extracts reflected-wave cancelling information for inhibiting effects of the reflected wave from the reception apparatus and that sets the extracted reflected-wave cancelling information in the driver.

2. The electronic component according to claim 1, wherein start of the measurement period is after a timing when the signal output from the driver reaches the reception apparatus and termination of the measurement period is before a timing when a reflected wave from a second reception apparatus reaches the driver.

3. The electronic component according to claim 1, wherein the controller outputs to the reflected wave detector, a control signal that controls the measurement period, and the reflected wave detector determines the measurement period, based on the control signal.

4. The electronic component according to claim 1, wherein the reflected-wave cancelling information includes information that is associated with the arrival time and the peak amplitude measured by the reflected wave detector and that indicates an arrival time and a peak amplitude of a reflected wave from a second reception apparatus.

5. The electronic component according to claim 4, wherein the driver includes
  a delay element that based on the arrival time that is for the reflected wave from the second reception apparatus and set by the controller, delays the generation timing of a pulse,
  a pulse generator that generates the pulse, and
  an adder that adjusts a peak amplitude of the pulse, based on the peak amplitude that is for the reflected wave from the second reception apparatus and set by the controller.

6. The electronic component according to claim 5, wherein the reflected-wave cancelling information includes information that is associated with the arrival time and the peak amplitude measured by the reflected wave detector and that indicates a pulse width of the reflected wave from the second reception apparatus, and
the pulse generator adjusts a pulse width of the pulse, based on the pulse width that is for the reflected wave from the second reception apparatus and set by the controller.

7. A reflected-wave cancelling method comprising:
determining a measurement period for measuring a reflected wave, based on reflection information related to the reflected wave, which returns to a driver that has output to a reception apparatus, a signal that is reflected back by the reception apparatus;
measuring an arrival time and a peak amplitude of the reflected wave, based on the measurement period;
extracting based on the arrival time and the peak amplitude, reflected-wave cancelling information that inhibits the reflected wave from the reception apparatus; and
setting the reflected-wave cancelling information in the driver.

8. The reflected-wave cancelling method according to claim 7, wherein
start of the measurement period is after a timing when the signal output from the driver reaches the reception apparatus and termination of the measurement period is before a timing when a reflected wave from a second reception apparatus reaches the driver.

9. The reflected-wave cancelling method according to claim 7, wherein
the reflection information is derived based on substrate relative permittivity and an interconnection length from the driver to the reception apparatus.

\* \* \* \* \*